(12) United States Patent
Reintjes et al.

(10) Patent No.: US 7,551,852 B2
(45) Date of Patent: Jun. 23, 2009

(54) MODULE TO MODULE SIGNALING

(75) Inventors: Maurice M. Reintjes, Beaverton, OR (US); Daniel Draper, Portland, OR (US); Gilberto I. Sada, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 360 days.

(21) Appl. No.: 11/182,423

(22) Filed: Jul. 15, 2005

(65) Prior Publication Data

US 2006/0034617 A1    Feb. 16, 2006

Related U.S. Application Data

(63) Continuation-in-part of application No. 10/916,216, filed on Aug. 10, 2004.

(51) Int. Cl.
  H04B 10/08    (2006.01)
  H04B 10/00    (2006.01)
  H04B 10/02    (2006.01)

(52) U.S. Cl. ............................. 398/33; 398/30; 398/31; 398/107; 398/167.5; 398/177

(58) Field of Classification Search ................. 398/106, 398/107, 112, 113, 165, 166, 167.5, 173, 398/177, 181, 30–33
See application file for complete search history.

(56) References Cited

U.S. PATENT DOCUMENTS

| | | | |
|---|---|---|---|
| 4,534,064 A | 8/1985 | Giacometti et al. | |
| 5,019,769 A | 5/1991 | Levinson | |
| 5,289,302 A * | 2/1994 | Eda .............................. | 398/51 |
| 5,383,046 A | 1/1995 | Tomofuji et al. | |
| 5,383,208 A | 1/1995 | Queniat et al. | |
| 5,394,416 A | 2/1995 | Ries | |
| 5,396,059 A | 3/1995 | Yeates | |
| 5,488,627 A | 1/1996 | Hardin et al. | |
| 5,594,748 A | 1/1997 | Jabr | |
| 5,636,254 A | 6/1997 | Hase et al. | |
| 5,796,501 A * | 8/1998 | Sotom et al. .................. | 398/59 |
| 5,812,572 A | 9/1998 | King et al. | |
| 5,844,928 A | 12/1998 | Shastri et al. | |
| 5,900,959 A | 5/1999 | Noda et al. | |
| 5,956,168 A | 9/1999 | Levinson et al. | |
| 6,108,113 A | 8/2000 | Fee | |
| 6,111,687 A | 8/2000 | Tammela | |
| 6,259,293 B1 | 7/2001 | Hayase et al. | |
| 6,282,017 B1 | 8/2001 | Kinoshita | |

(Continued)

*Primary Examiner*—Dalzid Singh
(74) *Attorney, Agent, or Firm*—Weide & Miller, Ltd.

(57) ABSTRACT

A method and apparatus configured to transmit module data between optic modules over a primary communication channel, such as an optic fiber configured to carry network data or outgoing data. A control center may send the module data, such as any type of DDMI data, over the optic fiber to control one or more aspects of the optic module system. The optic module may also be configured to send module data regarding any aspect of module status or operation, to a control center, via the optic fiber. Use of the primary communication channel, normally reserved for only network data, allow for module to module communication or module to control center communication without need of cumbersome two wire interface or supplement channels. Optic module data communication may occur concurrent with network data transmission. Optic module data back-up may occur via the optic channel to provide rapid re-load of important optic module data.

20 Claims, 15 Drawing Sheets

U.S. PATENT DOCUMENTS

| | | |
|---|---|---|
| 6,366,373 B1 | 4/2002 | MacKinnon et al. |
| 6,388,784 B1 * | 5/2002 | Nakamura et al. .......... 398/140 |
| 6,452,719 B2 | 9/2002 | Kinoshita |
| 6,494,370 B1 | 12/2002 | Sanchez |
| 6,556,601 B2 | 4/2003 | Nagata |
| 6,570,944 B2 | 5/2003 | Best et al. |
| 6,580,328 B2 | 6/2003 | Tan et al. |
| 6,661,940 B2 | 12/2003 | Kim |
| 6,707,600 B1 | 3/2004 | Dijaili et al. |
| 6,738,578 B1 * | 5/2004 | Mihota ........................ 398/22 |
| 6,740,864 B1 | 5/2004 | Dries |
| 6,801,555 B1 | 10/2004 | Dijaili et al. |
| 6,837,625 B2 | 1/2005 | Schott et al. |
| 6,852,966 B1 | 2/2005 | Douma et al. |
| 2002/0097467 A1 * | 7/2002 | Terahara et al. ............. 359/142 |
| 2004/0136727 A1 | 7/2004 | Androni et al. |
| 2004/0208526 A1 * | 10/2004 | Mibu .......................... 398/33 |

* cited by examiner

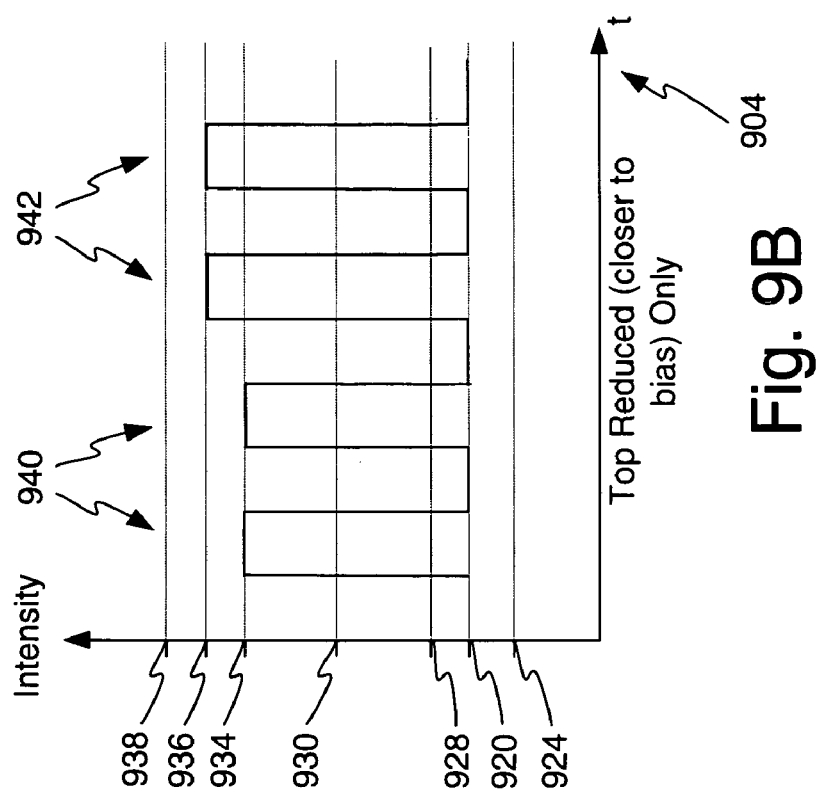
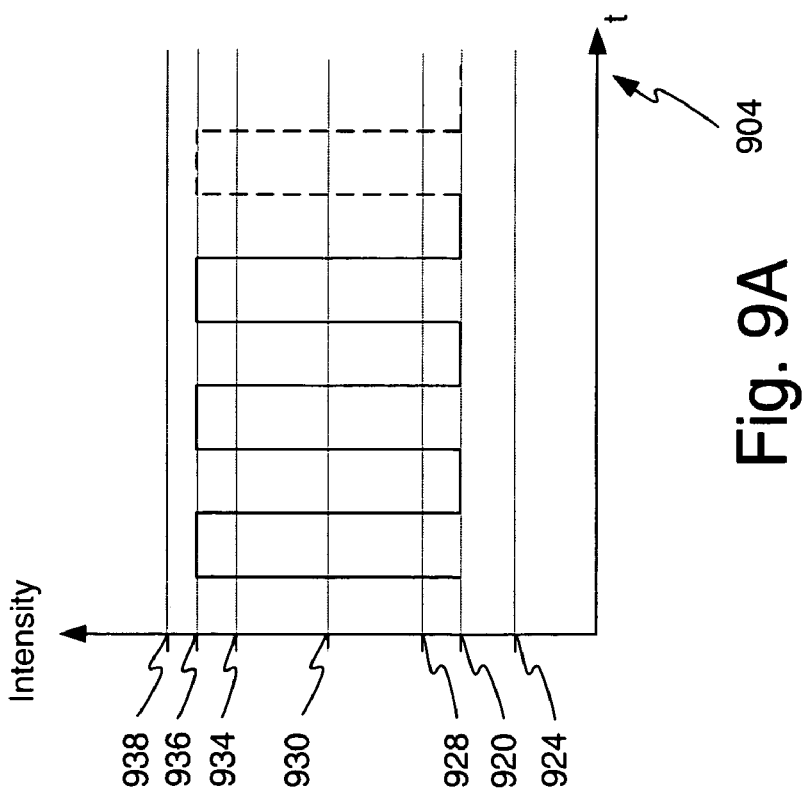

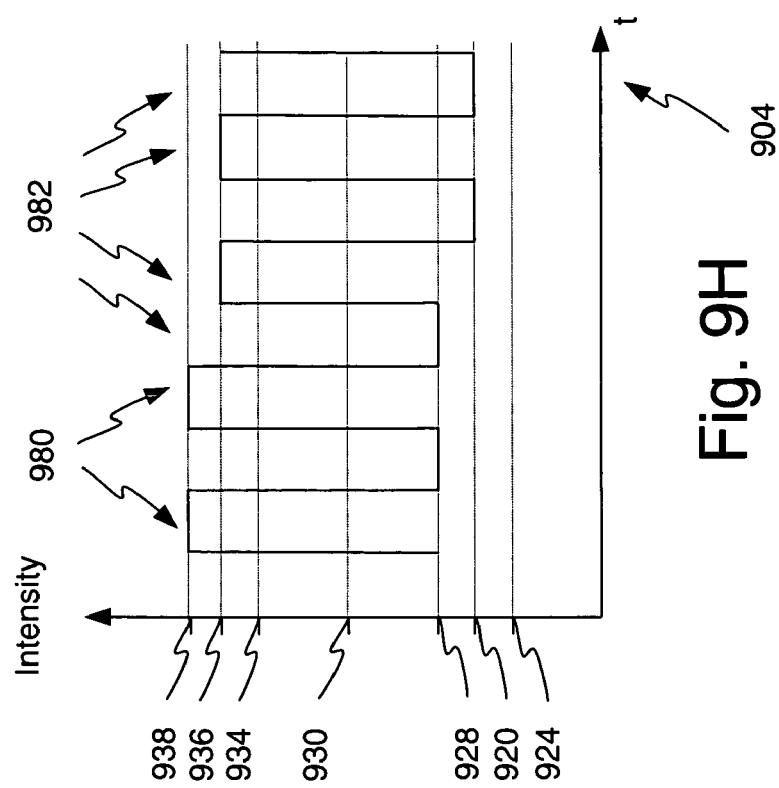
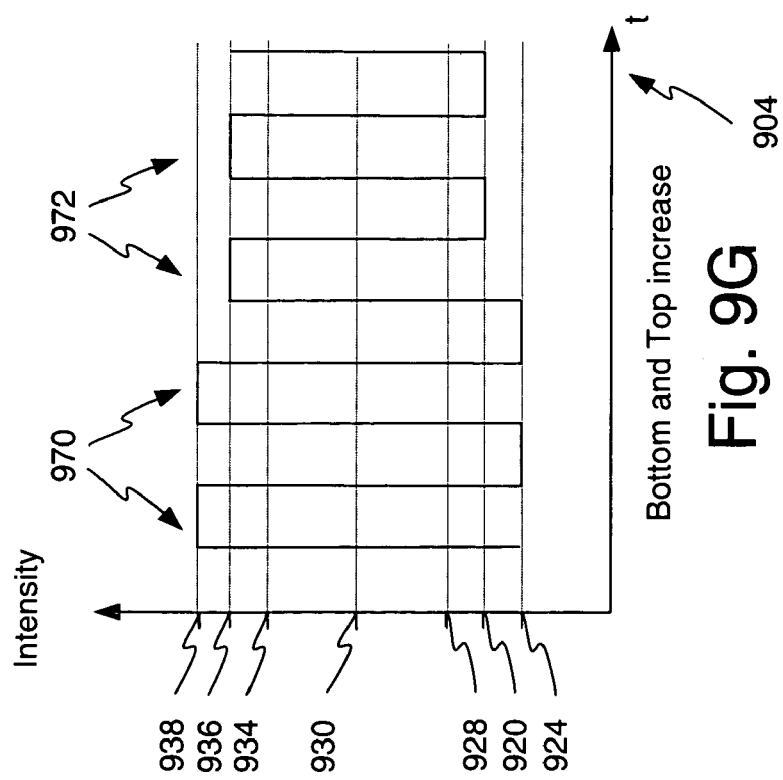

MODULE TO MODULE SIGNALING

PRIOR APPLICATION DATA

This application is a continuation-in-part of and claims priority to U.S. application Ser. No. 10/916,216, entitled Module To Module Signaling Utilizing Amplitude Modulation, filed on Aug. 10, 2004.

FIELD OF THE INVENTION

The invention relates to communication systems and, in particular, to a method and apparatus for inter-module communication.

RELATED ART

Communication systems designed to communicate network data between remotely located stations that utilize electrical or optical signals have been widely implemented throughout the world. The communication systems utilize stations or communication modules designed to demodulate the data for use, or utilize repeaters to span long distances between remote stations.

It may be desirable to enable system level communication between remotely located stations to exchange communication system data in addition to the network data, thereby improving the transfer of network data between the stations. For example, it is contemplated that analysis could occur on the network data in an attempt to optimize operation of the communication system and that this optimization may be transmitted to another station in the communication system.

Prior art solutions for exchanging system data between remote stations suffer from numerous problems and drawbacks. One prior art solution comprises forcing the communication system to cease transmission of network data so that system data can be exchanged. This is extremely undesirable because it forces the communication system to stop the transmission of network data. This undesirably interrupts operation of the communication system and reduces the overall transmission rate of the communication system for network data.

As an alternative, it has been proposed to insert the system data into the network data, such as by padding the system data bits onto the network data. This, too, is highly undesirable, as it increases the necessary transmit rate in order to accommodate the additional bit, or if this is not possible, reduce the effective network data transfer rate. Moreover, it may require that the network data be demodulated, and then re-modulated with the additional system data. This requires additional hardware in each station. In addition, inclusion of system data into the network data stream may cause operation of the communication system to fall outside of the communication standard under which the communication system is operating. This in turn may require non-standard communication hardware or software so that these changes may be accommodated.

As a result, there exists a need for an efficient, cost-effective, and accurate method and apparatus to achieve communication of system data between stations.

SUMMARY

To address the need in the art for an efficient and low-complexity inter-station signaling system, a system is disclosed herein for communicating module data between optic modules and module data backup via a primary communication channel. The term network data comprises data such as customer data, voice data, network data, or computer data that does not control or provide information regarding system operation. The term secondary data is used interchangeably with the term system data or module data and as used herein is defined to have the same meaning. The term system data or module data (secondary data) comprises data other than network data, that provides information regarding or controls system operation.

In one embodiment, a method for amplitude modulating module data with network data is disclosed to allow for the exchange of optic module data with an optic module at a remote location and an optic module control center. This method may comprise the step of receiving network data and receiving module data for transmission with the network data. Then, this method converts the network data to a drive signal configured to drive an optical signal generator such that the module data is amplitude modulated onto the network data. Thereafter, the method converts the network data drive signal to an optical signal. One or more intensity levels of the optical signal may be controlled by the module data to achieve the amplitude modulation. Thereafter, the method transmits the network data and the module data to the optic module control center which is configured to process or re-transmit the network data and process the module data to evaluate one or more aspects of operation or environment of the optic module at the remote location.

In one embodiment the module data comprises data regarding one or more of a module temperature value, a module current value, and a time of operation value. Furthermore, the one or more intensity levels comprise an upper intensity boundary, a lower intensity boundary or both. It is contemplated that the control center may comprise an optic module configured to communicate over an optic fiber with one or more remotely located optic modules. The control center may be configured with memory to back up module data from one or more optic modules located at remote locations. The control center may be further configured to transmit module data to the remotely located optic module and the remotely located optic module may be further configured to receive module data from the control center via an optic fiber.

Also disclosed herein is a method for communicating module data between optic modules of an optical communication system to thereby control or monitor one or more aspects of operation of an optic module. This method may comprise obtaining module data from an optic module, such that the module data is configured to provide information regarding one or more aspects of the optic module, and generating an optical signal generator drive based on module data. This method then provides the optical signal generator drive signal to an optical signal generator configured to generate an optical signal in response to the drive signal, which in turn causes the optic signal to be created. Thereafter, the method transmits the optical signal from a first optic module over an optical communication channel to a second optic module and then receiving the optical signal at a second location. Once received, it is converted to a received electrical signal and processed to obtain the module data.

In one variation, the module data is amplitude modulated onto network data. Furthermore, the second optic module may be configured as a control center with memory to store module data. For example, this may comprise storing the module data at the second location to thereby control one or more aspects of the optic module at the second location based on the module data. In one embodiment this module data is transmitted through the optic module at the second location to an optic module at a third location. Thus, the module data from a first optic module is transmitted through one or more different optic modules before being received, and stored in a memory at the second location to create a backup.

In addition to these methods, a system is also disclosed for sending module data to a remote optic module from a central location via an optic communication channel, the module data configured to control operation of one or more aspects of the remote optic module. This system may comprise a central location configured with access to an optic communication channel and transmitter configured to transmit module data on the optic communication channel. Also part of this system is a remote optic module configured to receive the module data from the central location and process or store the module data to thereby control one or more aspects of operation of the optic module based on the module data.

The remote optic module may further comprise memory configured to store one or more items of the module data. In addition, the remote optic module may be further configured to transmit module data from the remote optic module to the central location via the optic communication channel. Optionally, the central location may further comprise memory configured to backup module data received from remote optic module. In one embodiment the module data may comprise an address which identifies a particular remote optic module from a group of two or more remote optic modules thereby allowing the central location to selectively communicate with a particular optic module via the optic communication channel.

In one variation, the optic module is configured to concurrently communicate network data while communicating module data with the central location. It is also possible for the module data to comprise one or more of the following types of data: temperature data, bias current data, modulation current data, optic output power data, alarm or warning threshold values.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIGS. 9A-9H illustrates exemplary plots of various modulation schemes.

DETAILED DESCRIPTION

Figure 1:
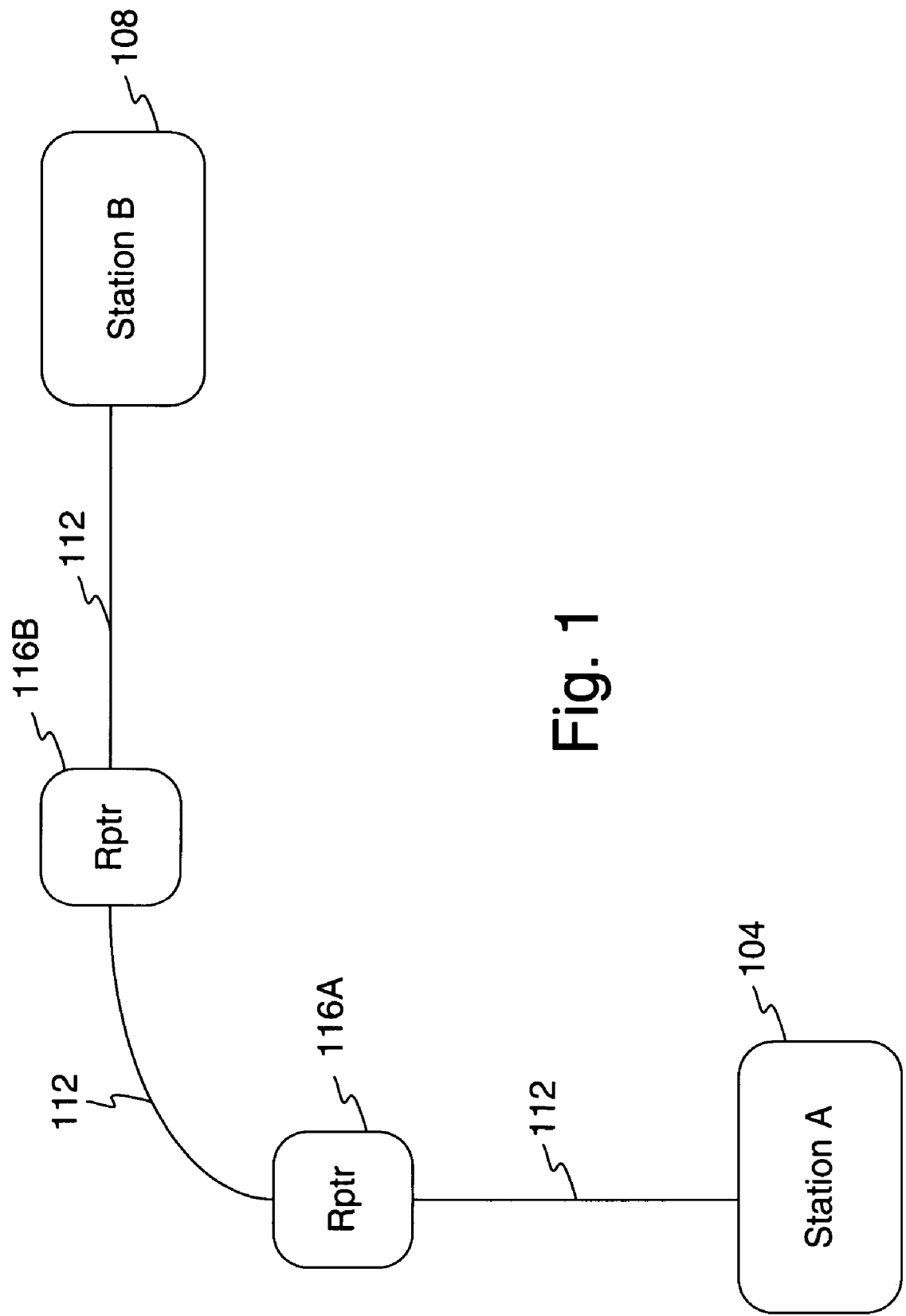
FIG. 1 illustrates an example environment of use of the present invention.

FIG. 1 illustrates an example environment of use of the present invention. In one example embodiment, the method and apparatus disclosed herein is utilized to communicate network data between a first station 104 and second station 108. The network data may travel over any path, conductor or channel 112 comprising, but not limited to, one or more metallic conductors, an optical channel, or free space communication such as radio or other frequency communication. If there exists sufficient distance between the first station 104 and the second station 108, one or more repeaters 116A, 116B may be required to process the signal so that the network data may reach the desired station. As is understood, a repeater may comprise a device that receives a signal and restores or amplifies the signal to a desired format before resending the signal onward. It is also contemplated that there may exist repeaters or stations in addition to those shown, or some systems may be configured without repeaters 116. The term network data comprises data that exchanged over the network, such as customer data, voice data, network data, or computer data. The term system data comprises data that concerns the communication system, such as to control or monitor the communication system or a station.

It is further contemplated that, in addition to network data, it may also be desired to exchange system data between the first station 104 and the second station 108, any of the stations and a repeater, or between repeaters.

By exchanging system data between communication devices, defined collectively as, repeaters, stations, or any other apparatus configured to aid in or enable communication, one or more aspects of the communication system may be monitored, adjusted, or exchanged. For example, one or more aspects of communication can be monitored and steps can be taken to modify some aspect of the communication to optimize the communication of the network data. Those of ordinary skill in the art may contemplate other additional uses for the method and apparatus described herein, and hence the claims that follow should not be construed as being limited to the example environments or example implementation set forth herein. Utilizing the method and apparatus described herein, any type of system data may be exchanged between communication devices for any purpose.

In one example embodiment, a low frequency signaling channel utilizing amplitude modulation is established to exchange system data between communication devices. Through use of low frequency signaling, system data may be exchanged to optimize, control, or otherwise monitor or manipulate communication system operation. Use of the low frequency signaling utilizing amplitude modulation is discussed below in more detail.

Figure 2:
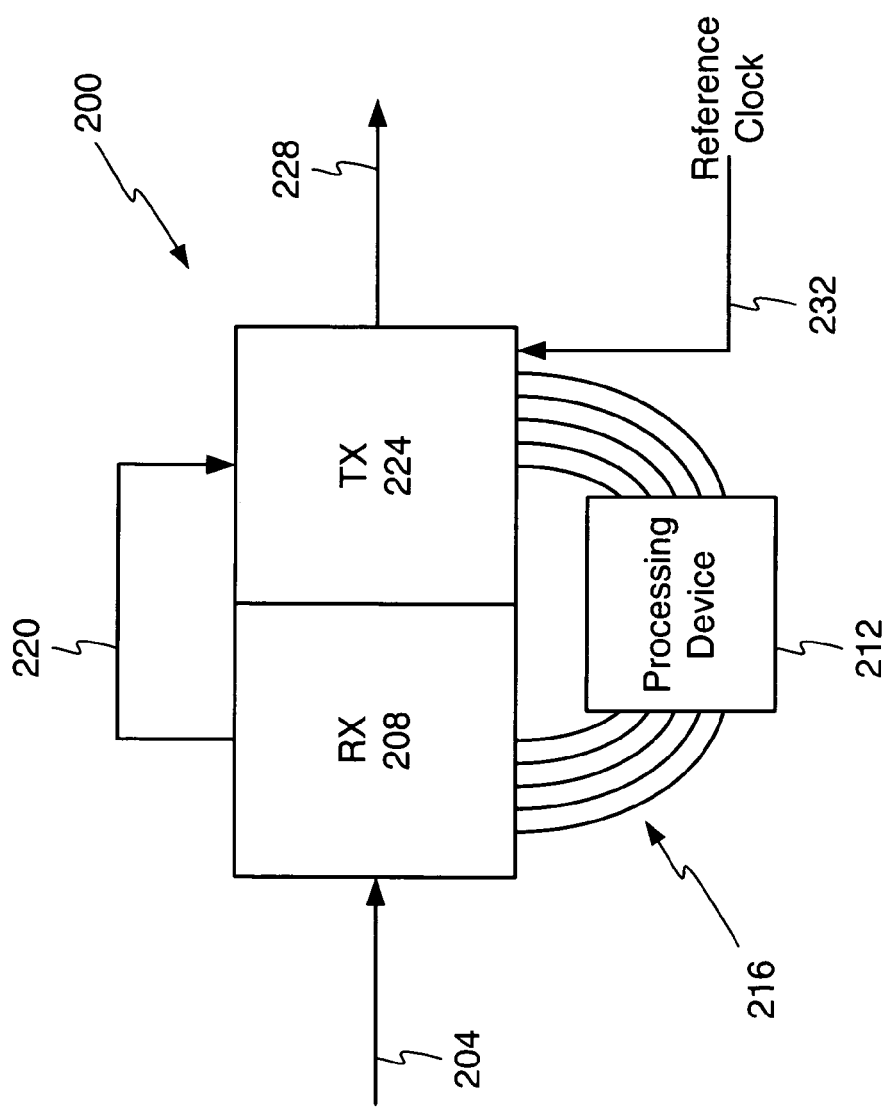
FIG. 2 illustrates a block diagram of an example embodiment of a repeater configured in accordance with the method and apparatus disclosed herein.

FIG. 2 illustrates a block diagram of an example embodiment of a repeater configured in accordance with the method and apparatus disclosed herein. In this example embodiment, the repeater 200 is characterized by a serial input line 204 that connects to a receiver portion 208 of the repeater 200. In this embodiment, the receiver portion 208 connects to a processing device 212 via one or more paths 216 and to a transmitter portion 224 of the repeater 200 via a low frequency path 220. The processing device 212 may comprise any type processing device including, but not limited to, a processor, ASIC, control logic, controller, or any other type device. The transmitter portion 224 provides an output on a path 228 and receives a reference clock signal on input 232.

The receiver portion 208 and the transmitter portion 224 may comprise any receiver system and transmitter system that is capable of achieving the functionality described herein. The functionality of both of the receiver portion 208 and the transmitter portion 224 is explained below in conjunction with several example embodiments.

In operation, the receiver portion 208 receives incoming network data and system data via path 204. In one embodiment, the system data is amplitude modulated onto the network data. In one exemplary embodiment, the path 204 comprises a fiber optic cable configured to provide the data to the receiver portion 208 in a serial format. The receiver 208 processes that data and provides the network data to the processing device 212, and provides the low frequency system data to the transmitter 224 via path 220. It is contemplated that the system data be of a lower frequency as compared to the network data.

In one embodiment, the processing device 212 comprises an ASIC type processing device, but it is contemplated that in other embodiments the processing device may comprise any apparatus capable of analyzing and/or manipulating the network data. The output of the processing device 212 returns the network data to the transmitter 224 wherein the transmitter may recombine or re-modulate the network data based on the system data for retransmission over output path 228. It is contemplated that the transmitter portion 224 may amplitude modulate the system data onto the network data. Separation and combination of the network data signal and the system data signal is discussed below in more detail.

Figure 3:
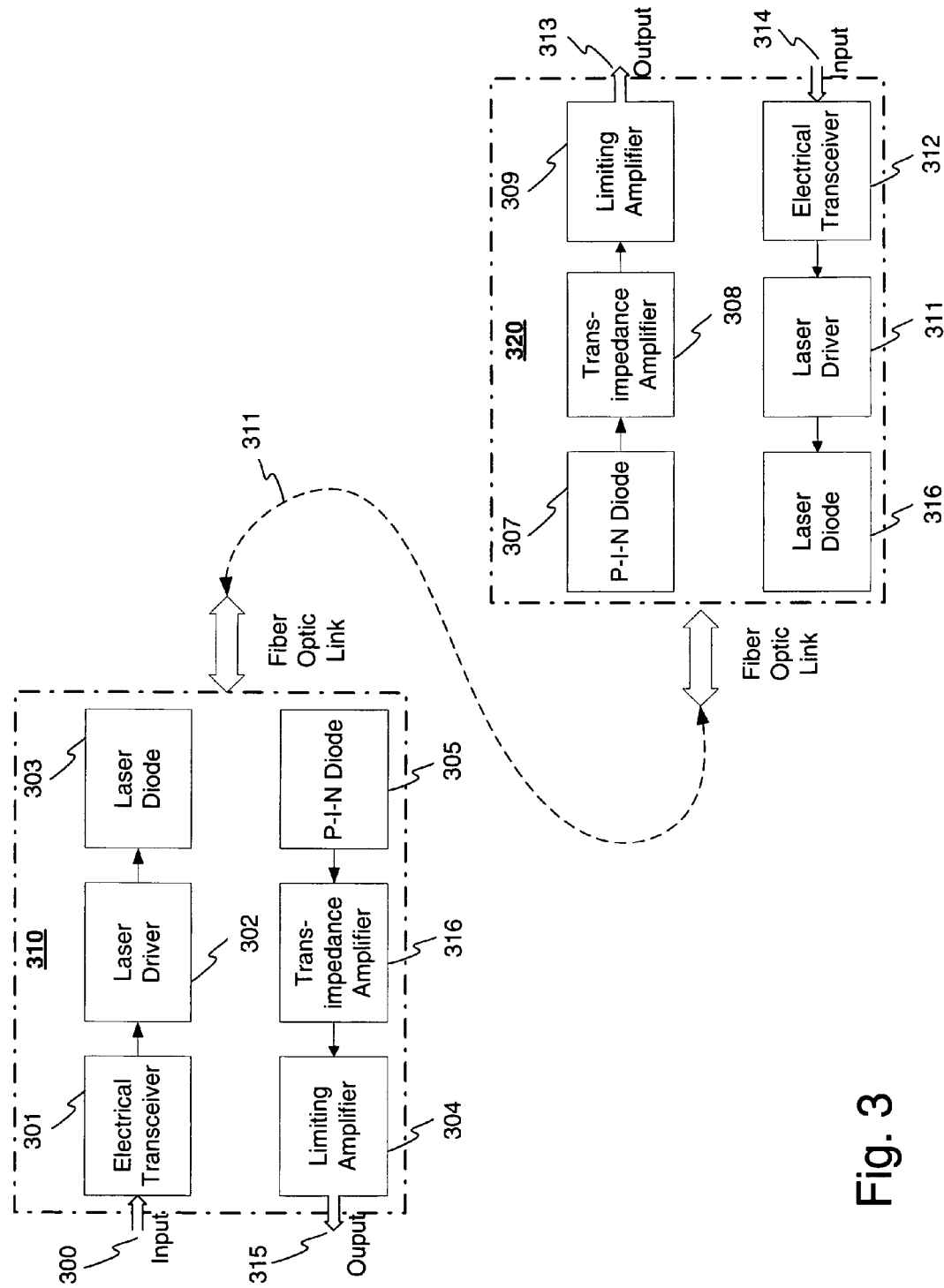
FIG. 3 illustrates a block diagram of an example embodiment of an optical front end for an optical communication system.

FIG. 3 illustrates a block diagram of an example embodiment of a transceiver configured to communicate over a fiber optic link. This is but one example embodiment of the components that may be utilized as part of a communication transceiver as described herein and as such it is contemplated that in other embodiments other components may be utilized. As shown a first transceiver 310 communicates over an optical link 311 with a second transceiver 320. The first transceiver 310 and the second transceiver 320 are generally similar in configuration and operation and hence only the first transceiver is described in detail.

An input 300 to the first transceiver 310 provides network data or another type of signal which is to be sent over the optical link 311. The input 300 connects to an electrical transceiver 301 which is configured to process the data to a format suitable for transmission over the optical link. In one embodiment this may comprise conversion to an analog format, coding, modulation or other such signal processing as would be appreciated by one of ordinary skill in the art. The output of the electrical transceiver 301 connects to a laser driver 302. The laser driver 302 is configured to convert the signal from the electrical transceiver 301 to a corresponding current capable of driving an optical generator 303 or other source of an optical signal. In addition, the laser driver 310 may also receive one or more additional control inputs, such as system data, to selectively modify the driving signal such as for example the bias, extinction ratio, or other aspects of operation. In one embodiment the system data control amplitude modulation of network data. As described below in more detail, modification or supplementation of the electrical transceiver 301 or the laser driver 302 may occur to enable communication of the system data over a low frequency side channel.

The laser diode 303 receives the driver signal from the laser driver 302 and generates a corresponding optical signal for transmission over the fiber optic link 311. Over time the operating parameters of the laser diode 303 or other devices may change and this may affect operation of the communication system. If the operational parameters of the laser diode 303 or the laser driver 302 change sufficiently, the communication link may become disabled. This is highly undesirable. Moreover, slow degradations over time may result in an increased bit error rate such that although the communication channel remains operational the effective data rate of the channel is reduced to undesirable levels.

Turning now to the receiver aspects of the first transceiver 310, a signal received over the fiber optic link 311 is provided to a PIN diode 305 or any other device capable of converting optical energy to an electrical signal. The PIN diode 305 comprises a device or system capable of detecting an optical signal and converting the optical signal to a corresponding electric signal. Devices other than a PIN diode 305 may be utilized such as but not limited to P-N junctions, avalanche photodiode (APD), charge-coupled device (CCD) detector, cadmium sulfide photocell, or metal-semiconductor-metal (MSM) detector. The output of the PIN diode 305, which comprises an electrical signal, feeds into a transimpedance amplifier 316 that is configured to amplify the received signal. In particular a transimpedance amplifier 316 provides signal amplification but introduces an extremely low amount of noise. As such it is ideal in the embodiment of FIG. 3, although in other embodiments devices other than a transimpedance amplifier may be utilized.

The output of the transimpedance amplifier 316 is provided to a limiting amplifier 304 which in this embodiment is configured to provide further amplification of the signal from the transimpedance amplifier 316 within a particular frequency band. In this configuration the particular frequency band for which the limiting amplifier 304 is tuned comprises the frequency band of interest for the communication signal received over the optical link 311. The limiting amplifier 304 may be configured to minimize the amount of noise introduced into the signal. The output of the limiting amplifier 304 is provided on an output 315 such as for additional processing, decoding, or subsequent transmission to another station or repeater within the fiber optic communication system. It is contemplated that components or systems within the transimpedance amplifier 316 or the limiting amplifier 304 may be modified or supplemented to detect and retrieve a low frequency side channel thereby allowing communication of the system data or secondary data between stations of the fiber optic communication system. It is also contemplated processing may occur on the signal provided on output 315 to thereby recover the low frequency side channel data, such as system data or secondary data.

The second transceiver 320 comprises elements 307, 308, 309, 313, 314, 312, 311, and 316 which are configured and operate generally similar to that described in connection with the first transceiver 310. As such, the second transceiver 320 is not described in detail again.

Figure 4:
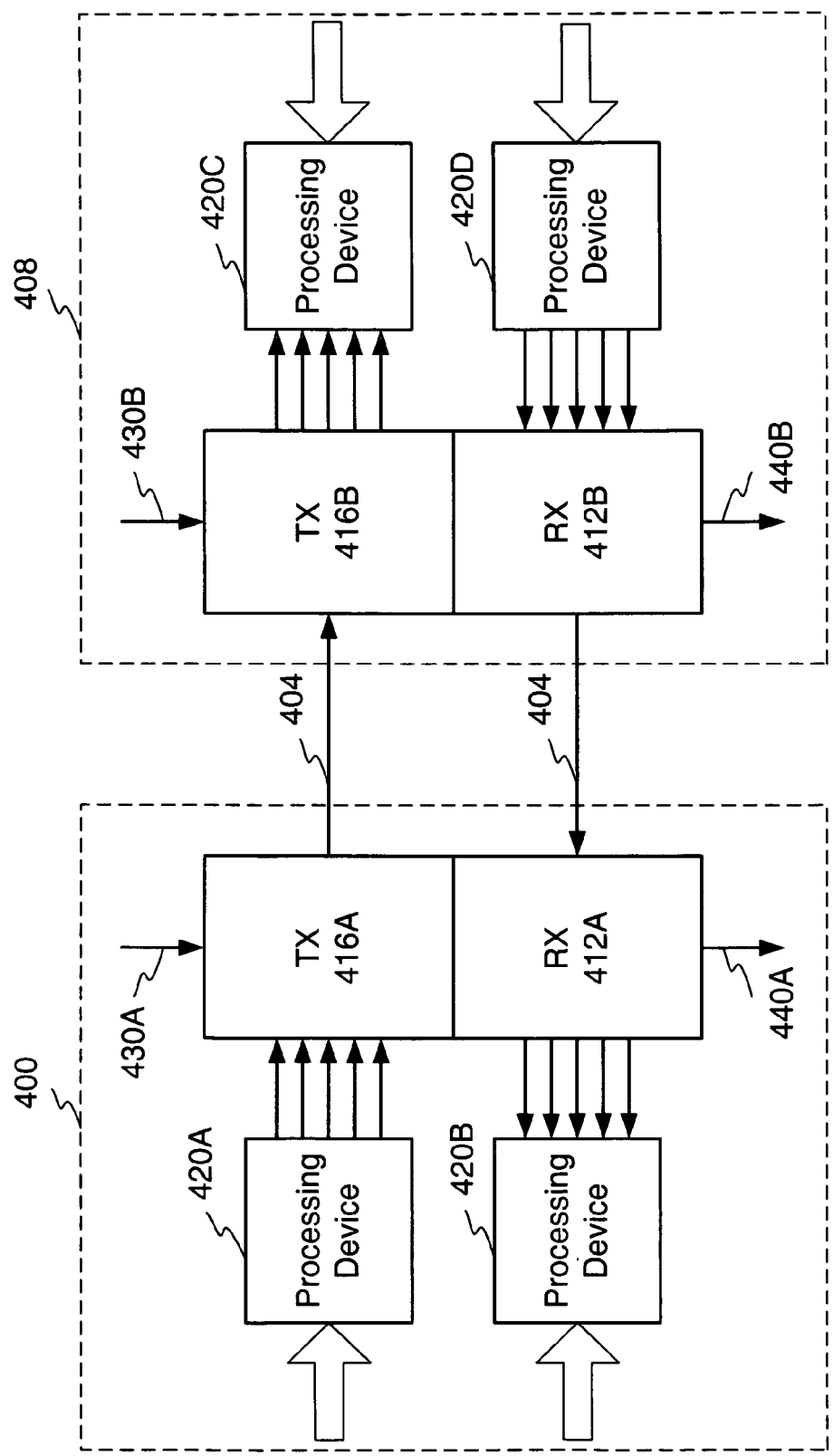
FIG. 4 illustrates a block diagram of an example embodiment of a multi-station communication system configured in accordance with the method and apparatus disclosed herein.

FIG. 4 illustrates a block diagram of an example embodiment of a multi-station communication system configured in accordance with the method and apparatus disclosed herein. The embodiment of FIG. 4 utilizes similar components as the system of FIG. 2. Therefore, during the discussion of FIG. 4, some components are not described in as great a detail, since reference can be made to the description of FIG. 2. As shown, a first station 400 is configured to communicate over one or more channels 404 with a second station 408. Each of the first station 400 and the second station 408 may comprise a receiver 412A, 412B and a transmitter 416A, 416B. At least one of the receivers 412A, 412B and transmitters 416A, 416B connects to a processing device 420A, 420B, 420C, 420D as shown. The processing devices 420 may comprise one or more processor, ASIC, control logic, switch fabric, modulator, demodulator, or any other such device. Input to the processing devices 420 may occur in any manner known in the art. Similarly, although certain paths or interfaces are shown as either serial or parallel, it is fully contemplated that any of these paths may be configured as either serial or parallel paths or both.

As optional inputs 430A, 430B to the transmitters 416A, 416B, comprise inputs that are provided for system data so that system data may be processed within or by the transmitters. This may allow the system data to be transmitted over the channel(s) 404 with the network data. In one embodiment, this data is amplitude modulated with the network data. Similarly, the receivers 412A, 412B have output ports 440A, 440B configured to provide system data that was recovered or separated from the signal transmitted over channel 404.

To overcome the drawbacks of the prior art, the method and apparatus disclosed herein enables communication between stations utilizing amplitude modulation of the network data to thereby include the system data. By selectively controlling the amplitude or intensity of the network data, the system data is included with or encoded onto the network data signal. In this manner, the system data is transmitted concurrent with the network data and in a manner that does not corrupt the network data and that does not result in the system data being lost as the combined signal passes through repeater stages or one or more additional stations. In addition the data rate need not be increased as the same data transmission is modified to carry the system data.

Figure 5:
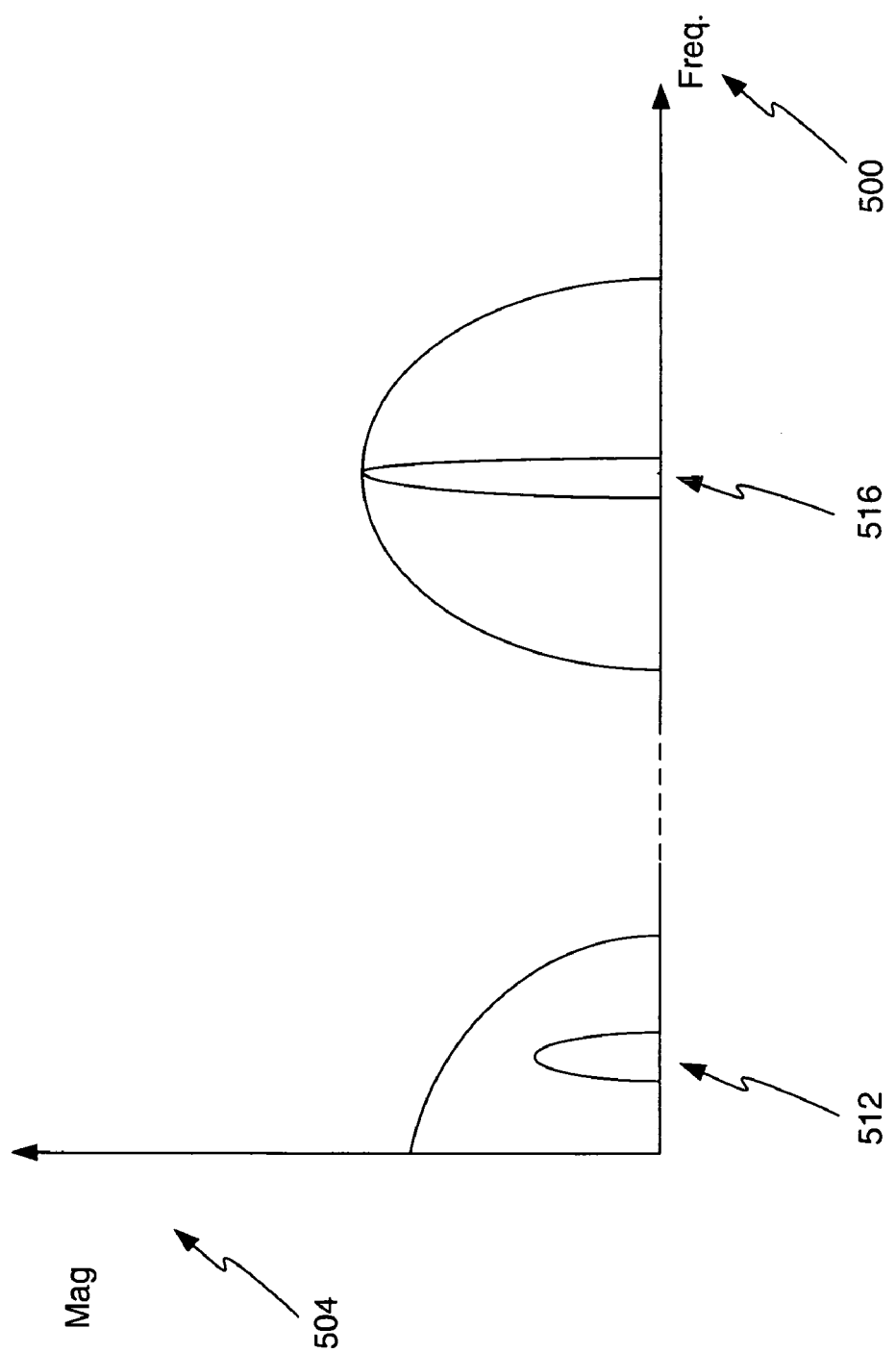
FIG. 5 illustrates a plot of the low frequency side channel in relation to the frequency bandwidth of network data in an optical communication system.

FIG. 5 illustrates an exemplary plot of the low frequency side channel, such as may be used to convey system data, in relation to the network or payload data. As shown, the horizontal axis 500 represents frequency while the vertical axis 504 represents signal magnitude. The network data, or payload 516 is located in the upper frequency ranges as compared to the system data or secondary data 512 which is located at lower frequencies, such as upon a low frequency side channel. These are exemplary plots and as such the claims that follow should not be limited to this particular relationship. It is contemplated however that the low frequency side channel and network data be transmitted over the optical link concurrently and the low frequency side channel be amplitude modulated onto the network data. In one embodiment the system data is at least ten times lower frequency than the network data.

Figure 6:
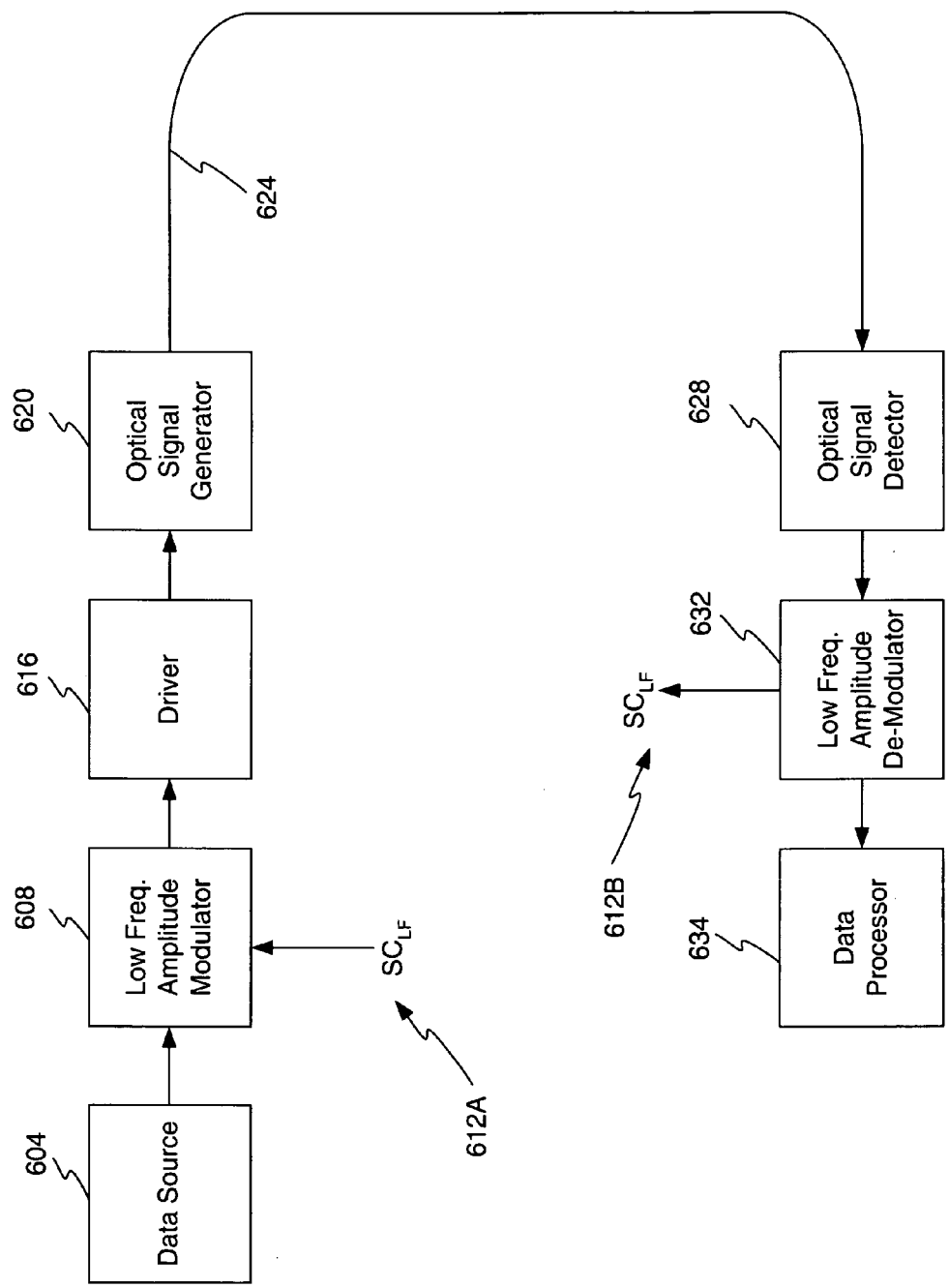
FIG. 6 illustrates a block diagram of an optical communication system of a amplitude modulated side channel.

FIG. 6 illustrates a block diagram of an example embodiment of an optical communication system having an amplitude modulated low-frequency side channel configured to convey system data. As shown, a data source 604 provides network data for communication over the optical network. The data source 604 may comprise any source of network data including but not limited to a computer network, communication device router, switch, transceiver, hub, bridge, or repeater. The output of the data source 604 feeds into a low frequency amplitude modulator 608 which is configured to amplitude modulate a low frequency side channel 612A ($SC_{LF}$) onto the network data that is received from the data source 604. In one embodiment, the low frequency amplitude modulator 608 modulates the network data from the data source 604 responsive to the side channel ($SC_{LF}$) comprising system data. This is described in detail below.

The output of the low frequency amplitude modulator 608 connects to a driver 616 that is configured to convert the amplitude modulated data source to a signal capable of driving an optical signal generator 620. It is contemplated that any type driver system or circuit 616 may be utilized. Likewise the optical signal generator 620, which connects to one or more optical conductors 624, may comprise any device or system capable of generating one or more optical signals. Such devices include but are not limited to continuously modulated optical sources such as light-emitting diodes (LED) and various types of lasers, or they might be continuously emitting optical sources modulated by an external device such as electro absorptive modulated lasers (EML).

It is further contemplated that the system data in the form of the $SC_{LF}$ may be provided to the driver 616 to control operation of the one or more driver signals that are provided to the optical signal generator.

Because the network data from the data source 604 is amplitude modulated by the system data or secondary data on the low frequency side channel 612A, the fiber optic conductor(s) 624 concurrently carry the network data and the system data. Transmission of the system data in this manner does not disturb transmission or reception of the network data. It is contemplated that the intensity of the optical signal may be modified sufficiently that the intensity changes may be detected to recover the system data, but not so significantly that the network data may be not recovered or that the data rate for the network data is reduced.

This combined signal is provided to an optical signal detector 628 which is configured to convert the optical signals to a corresponding electrical signal for subsequent processing. An amplifier (not shown in FIG. 6) may optionally be configured as part of the optical signal detector 628 or may reside after the detector 628 to amplify the received electrical signal.

The electrical signal is then provided to a low frequency amplitude demodulator 632 that is configured to detect the low frequency variations in the received signal to thereby isolate the system data on the low frequency side channel 612B. The system data recovery may also occur within an amplifier of the receiver. Because the system data controls the amplitude modulation of the network data, the system data may be recovered by monitoring one or more aspects of the received signal. After processing by the low frequency amplitude demodulator 632, the network data is forwarded to the data processor 634 which may be configured to process or otherwise utilize the network data. It is contemplated that the signal passed to the processor 634 may simply comprise the received signal. The amplitude modulation of the signal is such that it does not interfere with subsequent processing of the network data. In other embodiments other forms of amplitude modulation may require processing of the network data by the data processor 634 in such a way to enable recovery of the received network data. These operations are described below in more detail.

The embodiment shown in FIG. 6 is but one possible example embodiment of a communication system utilizing amplitude modulation of a high frequency signal to encode or include additional data that, in this embodiment, comprises a low frequency side channel of system data. This enables transmission between stations to include system data including but not limited to data regarding the operation or performance of the optical signal generator, driver, the error rate, the transmit power, the extinction ratio, received signal, operating environment, or any other system parameters. Processing or monitoring of this data allows for inter-station communication to thereby adjust transmission or reception parameters of operation to either improve operation or monitor for potential failures or degradation.

Figure 7:
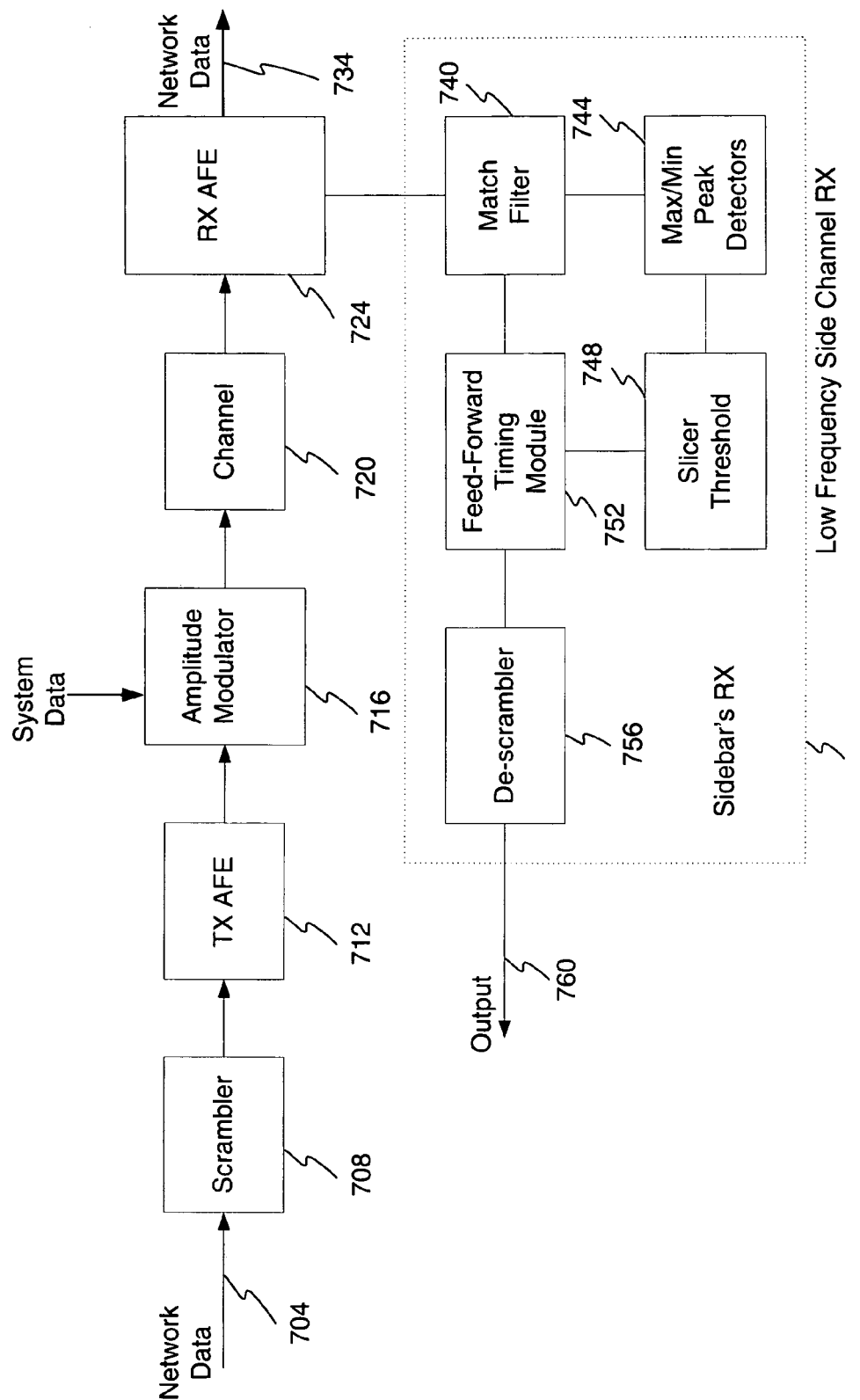
FIG. 7 illustrates a block diagram of an example embodiment of a transmitter-receiver pair configured to amplitude modulate network data based on system data.

FIG. 7 illustrates a block diagram of an example embodiment of transmitter-receiver pair configured to amplitude modulate network data to include system data. As would be understood by one of ordinary skill in the art, components in addition to those shown would likely be included to enable operation of a communication system. In addition, the components shown in FIG. 7 comprise the components relevant to the present invention and those helpful to gain an understanding of the invention.

In the embodiment shown in FIG. 7, an input 704 provides network data to a scrambler 708. The scrambler 708, which is known by those of ordinary skill in the art, processes the network data to inhibit undesirably long strings of logic value zeros or logic value ones which may otherwise disrupt system operation. The output of the scrambler 708 feeds into a transmitter analog front end (AFE) 712 which is configured to convert the digital network data to an analog format suitable for transmission over one or more channels, such as channel 720. As is understood by those of ordinary skill in the art, digital data may be transmitted over a channel in an analog format.

The output of the analog front end 712 feeds into an amplitude modulator 716 and is also configured as a signal generator. In this embodiment the amplitude modulator 716 also receives system data as an input. The amplitude modulator 716 is designed to concurrently transmit the system data and the network data over the channel 720. Amplitude modulation of the system data onto the network data does not affect the communication system's ability to receive and detect the network data at a receiver.

In the embodiment shown in FIG. 7, the system data controls the amplitude modulation of the network data whereby depending upon the logic level of the system data one or more aspects of the network data may be modified thereby causing the network data, when transmitted over the channels 720 to convey not only the network data but also the system data.

In the embodiment of FIG. 7 it is contemplated that any type modification to the network data may occur that utilizes amplitude modulation techniques. For example it is contemplated that the system data may control the bias level of the network data, the upper boundary intensity levels of the network data, the lower boundary intensity levels of the network data, the overall power level or bias level of the network data, or any combination of these factors. The various methods of operation of the amplitude modulator 716 are described below in more detail.

The output of the amplitude modulator comprises an amplitude modulated version of the network data, which is provided to the channel 720. It is contemplated that the channel 720 may comprise any type communication channel and the channel may comprise one or more optical channels or additional electrical type conductors. It is also contemplated that the channel may comprise free space. Furthermore channel drivers and optical signal generators may be located between the amplitude modulator 716 and the channel 720, although it is contemplated that the driver and signal generator may be part of the apparatus performing the amplitude modulation of the network data. As such the amplitude modulator may also then be configured as the driver and signal generator.

Turning now to the receiver side of the transmitter-receiver pair, a receiver analog front end 724 processes the received amplitude modulated network data as would be understood by one of ordinary skill in the art. The network data, which may also included the amplitude modulation effects, is provided on output 734 for subsequent processing. Amplitude modulation does not interfere with subsequent processing of the network data because the degree of amplitude modulation occurring on the network data is not significant enough to interfere with subsequent processing but is significant enough to be detected by the low frequency side channel receiver 730, which also receives the amplitude modulated network data as shown.

The low frequency side channel receiver comprises a match filter 740 configured to receive and selectively filter a particular frequency band of the output from the analog front end 724. The match filter 740 also connects to a feed-forward timing module 752 and a min/max peak detector 744. The min/max peak detectors 744 also connect to a slicer threshold 748 which in turn connects to the feed-forward timing module 752 as shown. The output of the feed-forward timing module 752 feeds into a de-scrambler 756 configured to reverse the effects of the transmit side channel introduced at amplitude modulator 716 or by a scrambler in the transmitter. The system data is shown on output 760 after having been recovered by the low frequency side channel receiver.

In operation the match filter 740 comprises a filter that is tailored to have a frequency response of a particular frequency or frequency band. The min/max peak detectors monitor one or more aspects of the received signal. In this embodiment the min/max peak detectors 744 monitor at the maximum and minimum values of the network data to thereby detect the amplitude modulation. By detecting the amplitude modulation of the network data, the system data may be recovered. The feed-forward timing module 752 and slicer threshold 748 operate in unison as a feedback loop to thereby generate the output signal provided to the de-scrambler 756. In other embodiments other configurations for and methods of operation of the low frequency side channel receiver 730 may be utilized. As discussed below in more detail there are numerous methods by which the system data may be utilized to modulate the network data and as such the configuration and operation of the low frequency side channel receiver is dependent upon the particular method of amplitude modulation utilized. For example, it is contemplated that the max/min peak detectors 744 may comprise a power monitor configured to monitor the average power or bias level of the modulated network data and based on this average power or bias level the system data may be recovered.

It should be noted that the low frequency side channel data is at a frequency rate which is below the network data. In one embodiment the frequency of the system data is 100 times slower than the frequency of the network data. Thus for every data sample of system data, there may be 100 or more samples of network data. In one example embodiment, the system data is provided at a rate of 1000-10,000 Hertz while the network data may be at 1 GHz or higher frequency. In one embodiment the network data is at a rate that is greater than 10 times the data rate of the system data. As can be appreciated there will be numerous samples of network data for each system data sample and, because of use of the scrambler 708, the numerous samples of network data will include numerous logic zero values and numerous logic once values. In such an embodiment regardless of the particular amplitude modulation scheme utilized the system data can be recovered.

Figure 8B:
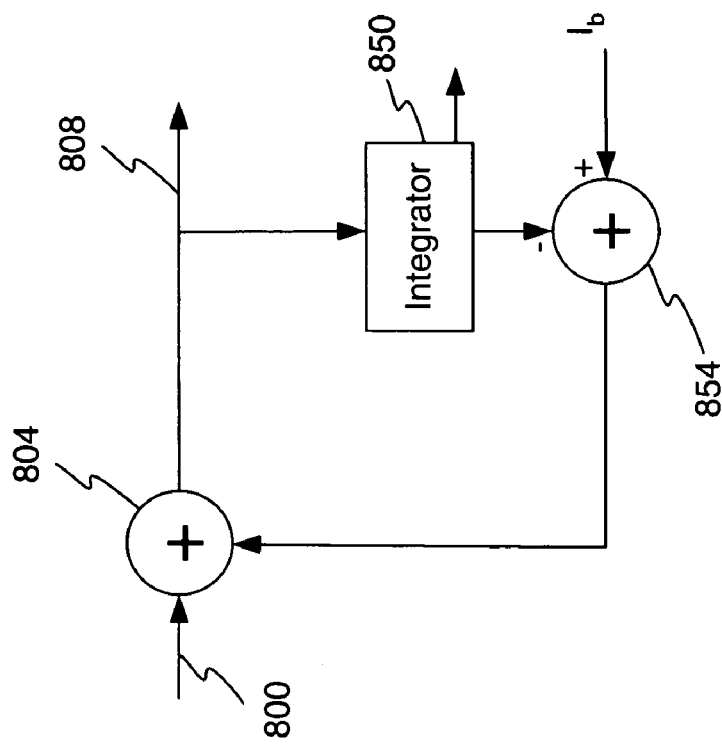
FIGS. 8A and 8B illustrate block diagrams of example embodiments of amplitude demodulators.
Figure 8A:
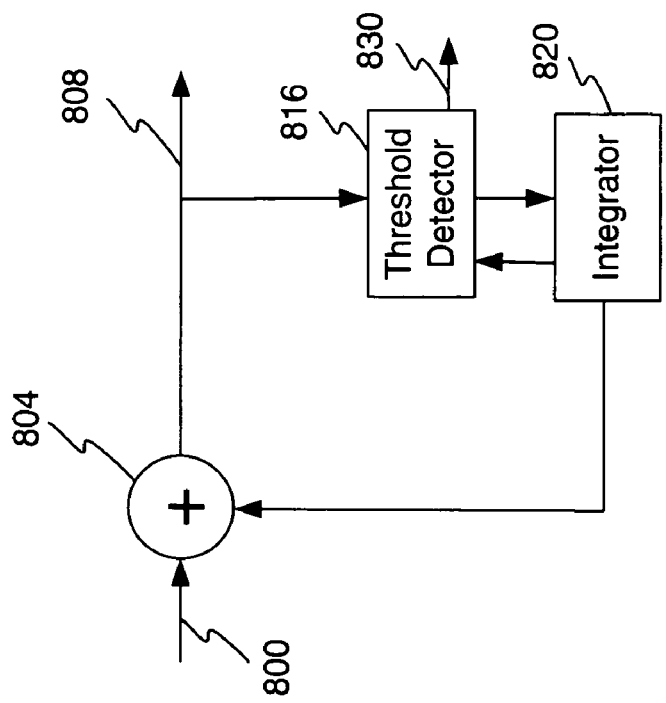

FIG. 8A and FIG. 8B illustrate block diagrams of bias feedback loops as may be found in communication amplifiers. It is contemplated that in one or more embodiments the signal may be recovered by monitoring the bias of the received signal or an indicator of the bias loop, if bias adjustment is utilized to modulate the network data utilizing system data. By monitoring a bias feedback loop within the receiver amplifier the power level or bias of a received signal may be monitored and tracked thereby allowing for recovery of the system data, which at the transmitter, is controlled by modulation of the network data. It is contemplated that in one embodiment the feedback loop connects to a clock and data recovery (CDR) circuit. The bias feedback loop may also be referred to as an automatic gain control, DC restore or power level adjustment module. This will be discussed below in more detail. One method of amplitude modulation comprises adjusting the bias level. This type of amplitude modulation reveals itself by monitoring or tracking the bias feedback loop signal.

In reference to FIG. 8A, an input 800 connects to a summing junction 804. The summing junction 804 also receives a feedback signal which is generated as described below. The output from the summing junction 804 is provided on an output 808 and to a threshold detector 816. The output of the threshold detector 816 passes the signal to an integrator 820, the output of which comprises the feedback input to the summing junction 804. The threshold detector 816 and the integrator 820 working in unison to average or sum the signal over time and compare the sum or average to a predetermined threshold. As result of the comparison to a threshold value, the signal may be supplemented or decremented to maintain the signal provided on the output 808 at a desired level. An output from the threshold detector 830 may be utilized to monitor the amount of adjustment that is performed on the signal and from this level of adjustment, the system data may be recovered or detected.

Stated another way, a received signal may serve as an input to an amplifier as part of the amplification process and/or part of the clock data recovery. The amplifier may be designed to maintain a generally constant input to a clock and data recovery circuit but, because of the amplitude modulation one or more components of the network data may be shifting upward or downward in magnitude or intensity as a result of the amplitude modulation of the system data. Components within the amplifier are trying to maintain a constant input to the CDR. In particular a controller, such as the bias feedback loop, may be configured to track this variation and compensate over time so that the input to the clock and data recovery is a generally constant signal. By monitoring and tracking the compensation provided by the control loop or bias loop, the amplitude modulation may be detected and as a result the system data is recovered. An advantage to this system, existing circuitry within the control loop is utilized to recover the system data thereby reducing the cost and complexity as compared to embodiments which may require additional circuitry to enable operation.

For example, if over time the signal provided to the threshold detector must be adjusted upward then in certain embodiments this may be an indication that the amplitude modulation has not increased or decreased the amplitude of the network data. Thus it may be assumed that the system data which controlled modulation during this period represented logic zero levels. Conversely if the loop or compensator is forced to decrease the value or amplification of the received network data then it may be assumed that the amplitude modulation, controlled by the system data, increased the value of network data at the transmitter. As a result, it may be assumed that the system data represented a logical one during this period. This is but one possible modulation scheme and hence the claims that follow are not limited to this particular configuration and as such this example modulation scheme is provided for purposes of understanding and not limitation.

FIG. 8B illustrates an alternative embodiment of the bias feedback loop as shown in FIG. 8A. In FIG. 8A only the aspects of operation which differ from that shown and described in connection with FIG. 8A are described. In the embodiment of FIG. 8B, the output 808 feeds into an integrator 850, the output of which serves as an input to a summing junction 854. The summing junction 854 also receives as an input a signal $I_b$, which represents the target signal level. In operation, the circuit of FIG. 8B performs as follows. The received signal variations due to amplitude modulation are compensated by the output of the summing junction 804. If the amplitude modulation decreases the average of the received signal, then the output of the summing junction 804 will compensate the signal by increasing its amplitude. Conversely, if the amplitude modulation increases the average of the received signal, then the output of the summing junction 854 will compensate the signal by decreasing its amplitude. The integrator 850 works in unison with the summing junction 854, and the target signal $I_b$ to average or sum the signal over time and compare the sum or average to the target signal $I_b$. An output from the integrator 850 or the summing junction 854 may be utilized to monitor the amount of adjustment that is performed on the signal and from this level of adjustment, the system data may be recovered or detected.

Figure 8C:
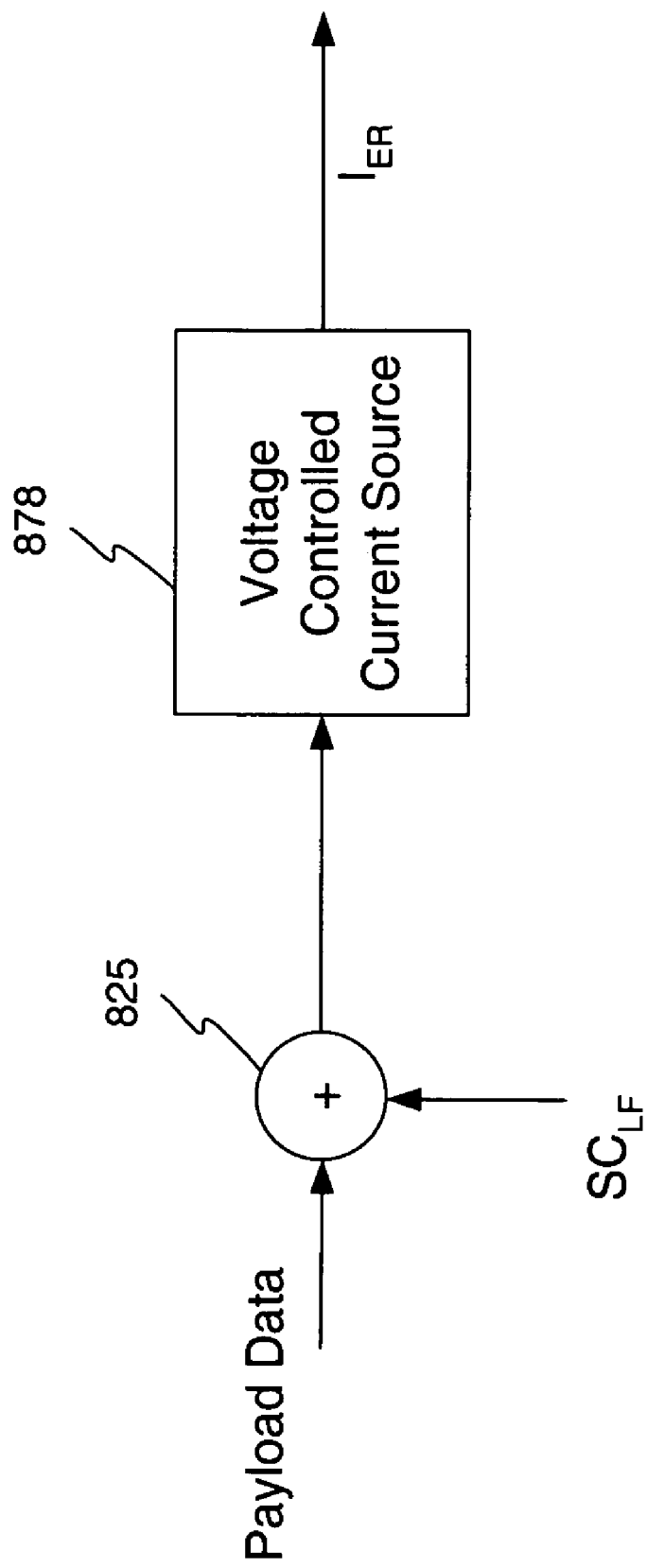
FIG. 8C illustrates a block diagram of an example embodiment of an amplitude modulator.

FIG. 8C illustrates a block diagram of an example embodiment of an amplitude modulator. This is but one example embodiment of a device configured to modulate network data, such as payload data and, as such, it is contemplated that one of ordinary skill in the art may enable other systems or methods for amplitude modulating network data. As shown, payload data is provided to a junction 875. The system data, shown as being received on the low frequency side channel ($SC_{LF}$) is also provided to the junction 875. The junction 875 may comprise a summing junction, a subtractor, or device configured to modify one or more aspect of the amplitude or intensity of the network data to thereby allow for recovery of the system data after transmission of the network data over a communication link. The various methods of modulation that may occur are shown and described below. In this example embodiment, the system data, which may be at a lower frequency than the payload data and may be scaled, is added to the payload data. Thus, for system data having a logic value of one, the value of the payload (network data) may be slightly increased while for a logic zero value for the system data the payload may remain the same or unchanged. In one embodiment the increase may be approximately 4%. In other embodiments the amount of increase or decrease in the amplitude or intensity of the network data (payload) may be any value or percentage. It should be noted that it is desired to accurately detect and decode the payload (network) data and thus the modulation of the payload data should not be such that it interferes with the communication process for the payload.

The output of the junction 875 connects to a voltage controlled current source (VCCS) 878. In one embodiment the VCCS 878 comprises a laser driver. In one embodiment the VCCS 878 comprises an extinction ratio control signal generator. In other embodiments the VCCS 878 may be configured as desired to control one or more aspects of the amplitude or intensity of the payload (network data). In the example embodiment shown in FIG. 8C the output of the VCCS 878 comprises a current $I_{ER}$ representing or controlling the extinction ratio of an optical signal generator.

Figure 9D:
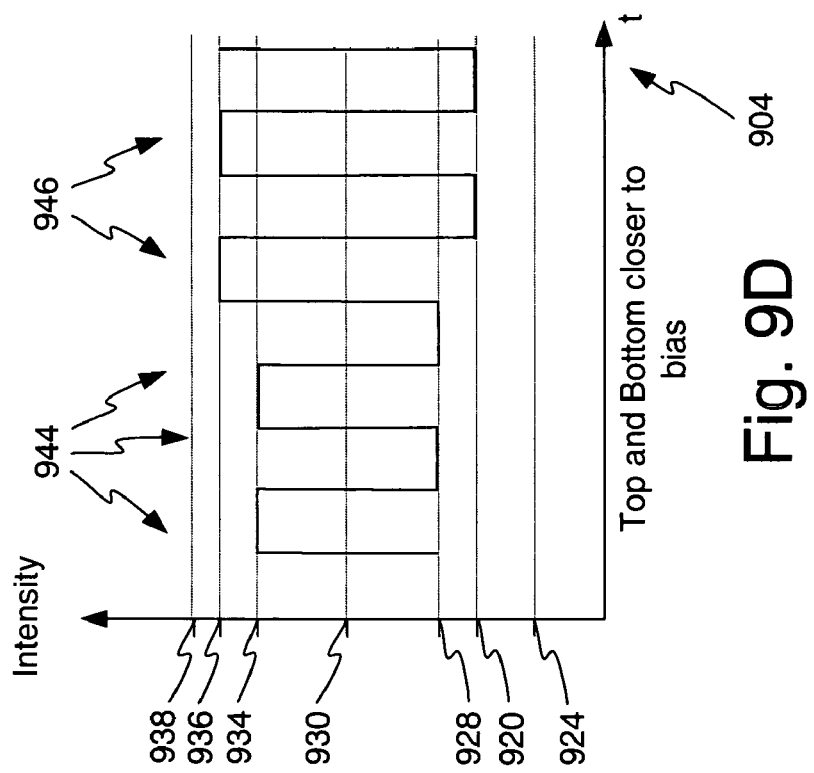

FIGS. 9A-9H illustrate plots of various amplitude modulation schemes for network data. FIG. 9A illustrates an exemplary plot of network data in an un-modulated state. As shown, the horizontal axis 904 represents time, while the vertical axis 908 represents signal magnitude or intensity. Absent modulation, the network data varies between an intensity level 936 and intensity level 920. It is contemplated that the operation of the signal driver, optical signal generator, signal detector, and subsequent signal processing may all operate as desired if the intensity level of the signal that represents the network data is between intensity level 938 and 934 for the upper intensity level and between intensity level 928 and 924 for the lower intensity level.

FIG. 9B illustrates an example method of modulating the network data whereby the upper intensity level is modified. In comparison between FIG. 9A and the other of figures, identical reference numbers identify identical elements. As can be seen in FIG. 9B the upper intensity level of the network data is reduced at samples 942 from intensity level 936 to 934. Samples 942 remain unchanged having an upper level at level 936. Thus, in one embodiment it is contemplated that the modulation scheme may be such that samples 940 represent a logical zero for the system data while samples 942 represent a logical one for the system data. Other modulation schemes may be utilized for the intensity levels of FIG. 9B.

Figure 9C:
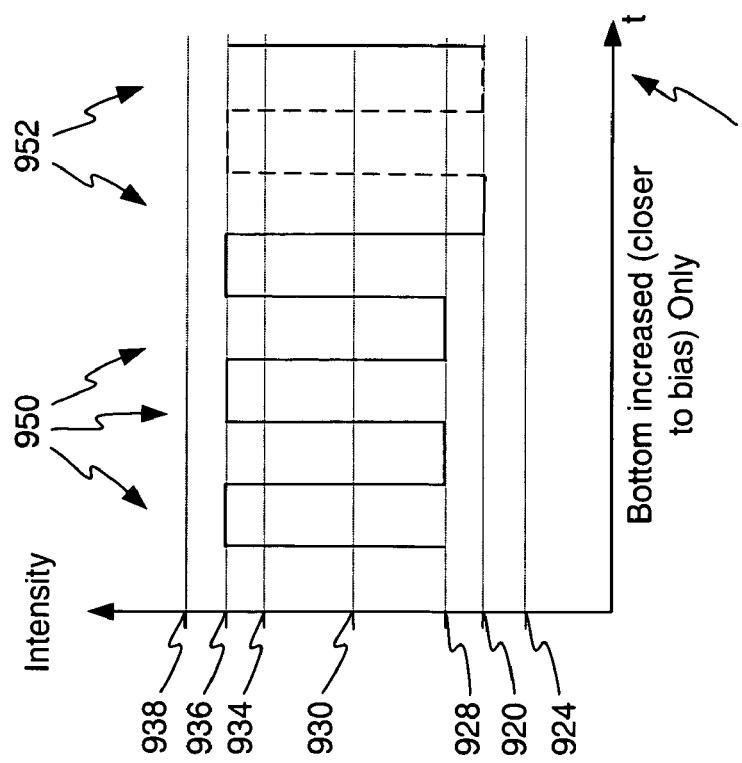

FIG. 9C illustrates example method of modulating the network data whereby the lower intensity level is modified. As shown, for samples 950 the intensity level of the lower boundary is increased to level 928 while for samples 952 the intensity level is not modified. In one exemplary modulation scheme, the lower intensity level of samples 950 represents a digital one for the system data while the lower intensity level of samples 952 may represent a digital zero system data.

FIG. 9D illustrates an example method of modulating the network data whereby both the lower and upper intensity levels are modified. As shown, for samples 944 the intensity level of the upper boundary is decreased to level 934 while the intensity level for the lower boundary is increased to level 928. For samples 944 this modulation scheme does not affect the average power level or the bias level. In one exemplary modulation scheme, the intensity level of samples 944 may represent a digital one value for system data while the samples 946 may represent a digital zero value for system data. This modulation scheme does not change the bias level of the network data.

Figure 9F:
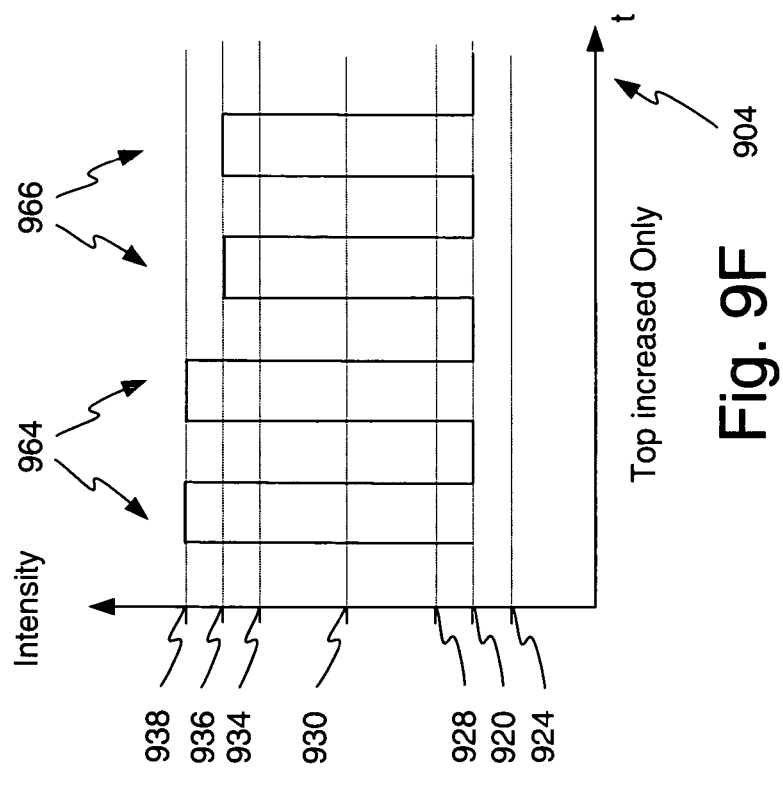
Figure 9E:
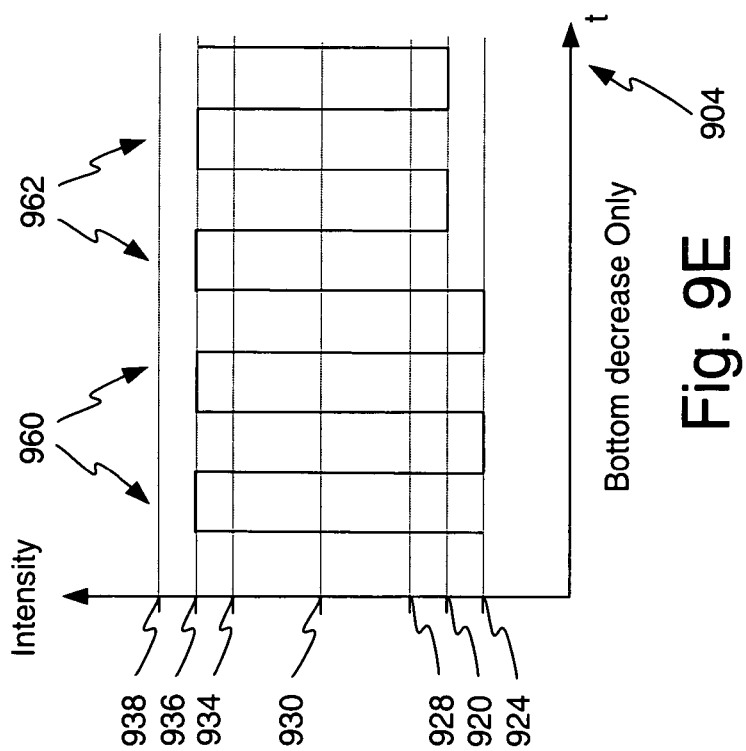

FIG. 9E illustrates an example method of modulating the network data whereby the lower intensity level is reduced. As shown, for samples 960 the lower boundary intensity level is set at level 924 while for these samples the upper boundary for the intensity level remains unchanged at level 936. For samples 962, both of the upper and lower boundaries remain unchanged at levels 936 and 920 respectively. Various system data representations may be contemplated based on this manner of modulating the network data.

FIG. 9F illustrates an example method of modulating the network data whereby the upper intensity level is increased. As shown, for samples 964 the upper boundary intensity level is set at level 938 while for the lower boundary for the intensity level remains unchanged at level 920. For samples 966, both of the upper and lower boundaries remain unchanged at levels 936 and 920 respectively. Various system data representations may be contemplated based on this manner of modulating the network data.

FIG. 9G illustrates an example method of modulating the network data whereby both the upper intensity level and the lower intensity level are modified as part of the amplitude modulation. As shown, for samples 970 both the upper and the lower boundary intensity levels are modified. Thus the upper boundary is set to level 938 while the lower boundary is set to level 924. For samples 972, both of the upper and lower boundaries remain unchanged at levels 936 and 920 respectively. Various system data representation schemes may be contemplated based on this manner of modulating the network data.

FIG. 9H illustrates an example method of modulating the network data whereby both the upper intensity level and the lower intensity level are modified as part of the amplitude modulation. As shown, samples 980 are shifted upward in intensity to levels 938 and 928 as shown. For samples 982, both of the upper and lower boundaries remain unchanged at levels 936 and 920 respectively. Various system data representations schemes may be contemplated based on this manner of modulating the network data. For example, samples 980 may represent a digital one value for system data while samples 982 may represent a digital zero value for system data.

Another advantage of the method and apparatus described herein is that it is capable of utilizing many existing components that are already utilized within modern communication devices. The method and apparatus described herein does not require additional de-modulators, modulators, or other such hardware. Thus the cost, complexity, power consumption, and heat generation as part of implementing the invention is minimized. Moreover, processing of the system data may be done at low frequencies, thereby minimizing system complexity.

Figure 10:
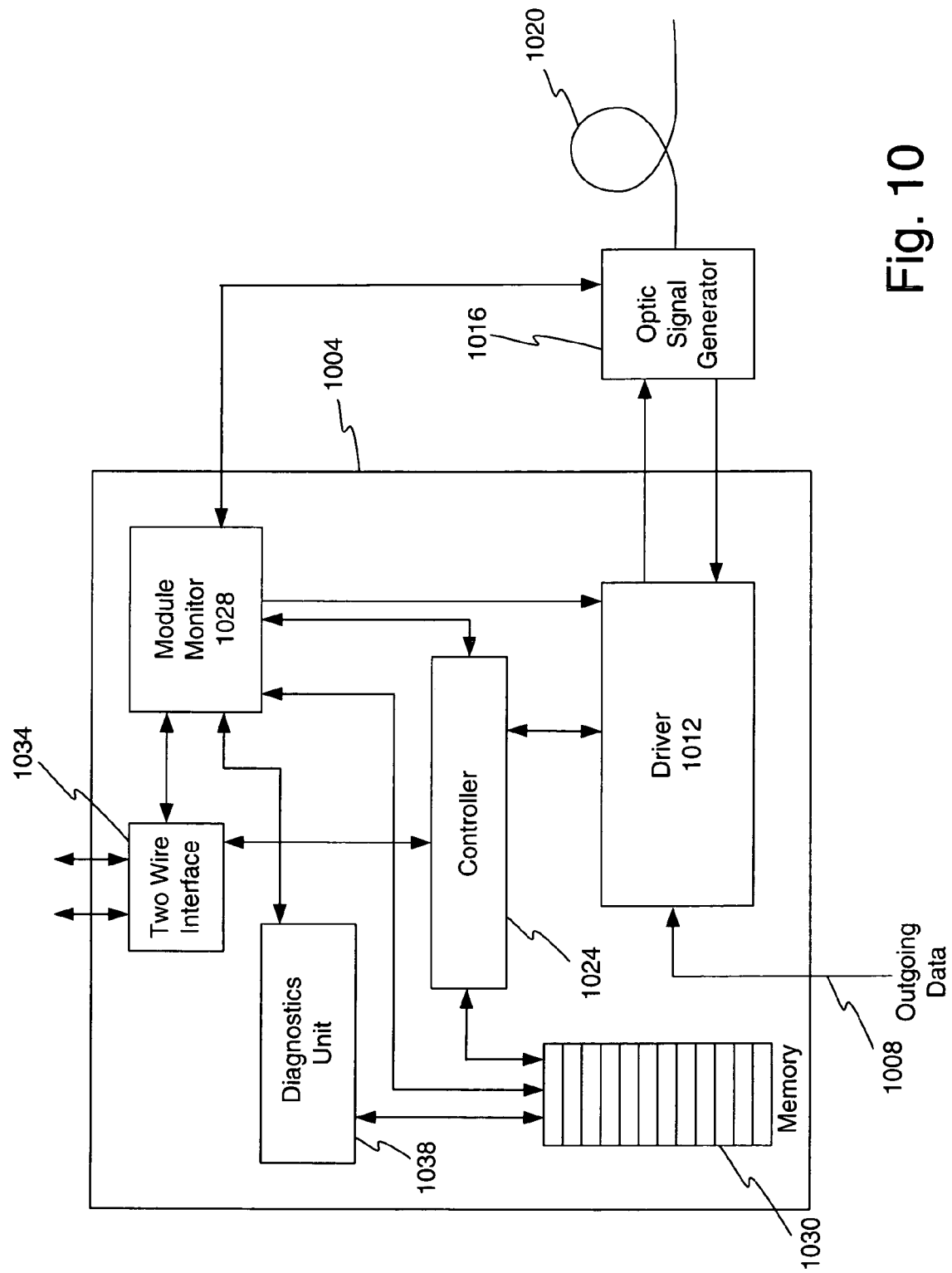
FIG. 10 illustrates a block diagram of an example embodiment of a module management system for an optic module.

As discussed above in detail, the various stations may comprise or include an optic module. FIG. 10 illustrates a block diagram of an example embodiment of a module management system for an optic module. As way of example and not limitation, the optic module shown in FIG. 3 maybe used with the module management system shown in FIG. 10. Although the receive path as discussed and shown in FIG. 3 is not shown in FIG. 10, one of ordinary skill in the art would understand that such a path would exist in a transceiver environment. One example of an interface for module management comprises DDMI (Digital Diagnostic Module Interface) as set forth by the SFF Committee in SFF-8472 for Diagnostic Monitoring Interface for Optical Transceivers, which is hereby incorporated by referenced herein. In this example embodiment shown in FIG. 10, additional functionality is added, in addition to the functionality contemplated by SFF-8472.

In this embodiment, an outgoing signal is provided to the module 1004 via input 1008. In this embodiment the outgoing signal is provided directly to a driver 1012, which converts the outgoing signal to a signal suitable for driving an optic signal generator 1016. The optic signal generator 1016 generates an optic signal representing the outgoing data, which in turn is provided to one or more optic fiber 1020 for transmission to a remote location.

Also part of the optic module 1004 is a controller 1024, which connects to numerous other elements of the module. In one embodiment, the controller 1024 is configured to oversee operation of the entire module and direct communication between elements and communication external to the module.

The controller 1024 also connects to a two wire interface 1034, which in other embodiments may comprise any type interface. The interface 1034 provides means to input data to and output data from the module 1004. The two wire interface 1034 may connect to an external communication bus, connect to a computer, or other processing element to allow for user interface with the module 1004, such as by technician physically at the station that houses the module 1004. The two wire interface 1034 may optionally communicate with other elements of the module 1004.

An optic module monitor 1028 may connect to one or more of the controller 1024, driver 1012, and the interface 1034. In one embodiment the module monitor 1028 is configured to monitor one or more aspects of the module. The aspect of the module 1004 that the monitor 1028 may monitor include, but are not limited to, current, temperature, time of operation, received/transmitted power level, biasing current, modulation current, supply voltage and/or current level, link status, read back modulation current, bias current, voltage, average received power, peak received power, settings for retimer loop bandwidth, frequency, lock status output amplitude on the electrical interface, input equalization, output pre-emphasis, peaking, pulse-width-control, output waveform crossing percentage, received waveform crossing percentage, input data detector status, safety circuit logic status, laser temperature compensation, correction factors for the above measured values and settings, and the like and optic signal generator status. Additional data, which maybe generated or monitored by the monitor 1028 is set forth below.

The controller 1024 also connects to an optic module diagnostic unit 1038 configured to perform one or more diagnostic operations on the module 1004. In one embodiment the diagnostic unit 1038 is configured to generate one or more types of diagnostic data. The diagnostic unit may also be configured to disable, modify and/or read back modulation current, bias current, voltage, temperature, average received power, peak received power, settings for retimers, output amplitude on the electrical interface, input equalization, output pre-emphasis, peaking, pulse-width-control, output waveform crossing percentage, received waveform crossing percentage, input data detector status, safety circuit logic status, laser temperature compensation, correction factors for the above-measured values, settings, and the like, or apply operations on the output from monitor 1028.

The controller 1024 and optionally one or more other elements may connect to a memory 1030. The memory 1030 may comprise non-volatile memory, volatile memory, or both. The memory 1030 may be configured to store one or more values as determined by or generated by the controller 1024, diagnostic unit 1038, and/or the monitor 1028. It is further contemplated that the memory 1030 is accessible by the interface 1034. The memory may be configured to store any data or information as contemplated by the SFF-8472 standard and any information or data that may be generated or used in future embodiments or standards. It is also contemplated that the following type of data or information may be stored in memory: Temperature bias and/or modulation current control look up tables, calibration constants for external monitors, calibration/support constants for thermo-cooler system, time constants for aging control of the optical signal generator, read back modulation, peak received power, settings for retimer loop bandwidth, frequency, lock status output amplitude on the electrical interface, input equalization, output pre-emphasis, peaking, pulse-width-control, output waveform crossing percentage, received waveform crossing percentage, input data detector status, safety logic status, correction factors for the above-measured values and settings and the like or any other device. The types of data and information listed in SFF-8472 are expressly also included herein.

In operation, the outgoing signal on path 1008 arrives at the driver 1012. The driver 1012 processes the outgoing signal to create the outgoing signal in a format suitable for driving the optic signal generator 1016. The generator 1016 generates and transmits an optic signal to the fiber 1020. Controlling the driver 1012 is one or more inputs from the controller 1024. One or more module 1004 or controller 1024 settings or configuration data may be stored in memory 1030.

A monitor 1028 may be configured to monitor one or more aspects of module 1004 or any aspect of the elements that comprise the module, or any environmental aspect. The module 1028 may create monitoring data. The monitor 1028 may communicate with any component within the module 1004.

The interface 1034 is configured to input data into and out of the module 1004. The diagnostics unit 1038 may perform one or more routines, tests, or tasks for the module 1004. Data regarding the diagnostics, such as for example and not limitation, test results, may be stored in the memory 1030 as diagnostic data.

Any type of data, as would be understood by one of ordinary skill in the art or as set forth herein, may be stored in the memory. The following list of information, list some, but not necessarily all, of the types of data that may be stored in memory: diagnostic data, calibration and alarm/warning signals, thresholds or limit data, type of serial transceiver (module), extended identifier, connector type code, electronic or optic compatibility code, link length supported for optic or wire line, vendor name, company identification or code, part number, revision level or software version, laser wavelength, any type extended ID field, encoding type or mechanism, bit rate such as nominal, channel length, channel type, module option selections including rate select, transmit disable status, transmit fault status, signal status. The memory may also store data regarding maximum bit rate, minimum bit rate, vendor serial number, date code, type of diagnostic monitoring, such as received power monitoring, transmitted power monitoring, bias current monitoring, supply voltage monitoring, temperature monitoring, calibration options, average input optic power, peak-to-peak input optic power. Moreover, the memory 1030 may also store data or information regarding addressing modes, various enhanced option settings, actual internal supply voltage, actual transmitter or receiver bias current, actual transmitter output power, received optical input power level, future defined values, calibration values, module temperature, temperature compensation settings, temperature high and low alarm and warning thresholds, voltage high and low alarm and warning thresholds, bias level high and low alarm and warning thresholds, transmitted signal power high and low alarm and warning thresholds, received signal power level high and low alarm and warning thresholds, any other reserved warning or alarm thresholds, any type status bit such as software disable flag, rate select bit, fault output flag, data status flag, link failure data, vendor specific memory addressing, and two wire interface address.

In addition, it is also contemplated that the following types of data or information may be stored in memory, including but not limited to, module age value, module in use time value, feedback values for bias current or voltage values, feedback values for modulation current or voltage values, historical or previous information for any type data or information, memory addressing, module addressing, present or previous compensation values, peak received power, settings for retimer loop bandwidth, frequency, lock status, output amplitude on the electrical interface, input equalization, output pre-emphasis, peaking, pulse-width-control, output waveform crossing percentage, received waveform crossing percentage, input data detector status, safety circuit logic status, laser temperature compensation, correction factors for the above measured values and settings, thermo-cooler values, link status, link loss information, and optical signal generator status, or any other data that is currently or in the future utilized by the module and/or stored in the memory 1030. All of these various types of data may be referred to generally as module data or DDMI data.

This data may be important to the operation of the module. In some instances, it may be necessary to input data or information into the module, such as any of the data or information described herein. This data may be used for any purpose, such as, but not limited to those described herein, such as, but not limited to, controlling the module. In some instances it may necessary to input data or information into the module to insure proper operation of the module. In other instances it may be necessary to change or update data or information in the module, after the module is installed, or during operation of the module. These changes may occur for any reason and at any time and in response to any event.

In other instances it may be desired to read or retrieve data from the module. In one instance it may be desired to read one or more values, such as any data or information described herein, from the module as part of the set-up or configuration process. In another instance, it may be desired to retrieve one or more values or data from the module during operation, such as part of a re-configuration, monitoring, or diagnostic process.

In one prior art embodiment, one such method of reading or writing data or information is via the two wire interface, which is output directly from the module to a module reader, which may be physically connected to the module. The interface may be accessible via a direct connection, such as a laptop type computer operated by a technician using a 2-wire interface access. This method is generally undesirably because a direct connection must be established with each module using the two wire interface, data exchanged, and the process repeated. This is a slow and tedious process and requires use of a highly skilled, and likely highly paid, technician who must travel to the module.

If the modules are attached to some form of shared bus, then some means for bus management must also be established and the technician must physically connect to the bus and read or write the data. Regardless, extra communication channel(s), in addition to the optic fiber, are required to provide data to and received data from the module. This adds complexity and cost to such systems. Furthermore, certain module locations are impossible or difficult to access. Optic links, such as modules configured as repeaters, are located underwater when configured in an undersea crossing or at remote location for between city connections. Even optic modules located in congested cities, such as in high-rise offices, may be difficult and expensive to access.

To overcome these drawbacks and provide additional advantages, in one embodiment the side channel communication capability described above is combined with optic module having one or more control functions to provide a method and apparatus for reading or writing data to the module. The optic fiber or other primary communication path is also utilized to exchange module data, such as for example any type of data or information identified herein, or any other type of data used by or generated by the module. In one embodiment, the module data is established as low frequency side channel data and transmitted concurrent with outgoing data, i.e. systems data. For purposes of understanding, module data may be referred to a secondary data, while the outgoing data may be referred to as system data.

As an advantage over prior art systems that utilize the two wire system to read and/or write to the module, utilization of the optic channel itself reduces cost, complexity, and allows easier access to the module. This is particularly true for remotely located or difficult to access modules. Access may also be made in real time, without the need to dispatch a technician.

In reference to FIG. 6, the $SC_{LF}$ may comprise the module data, and as shown and described above, which is provided to the low frequency amplitude modulator 608. The data source 604 provides outgoing data to the modulator 608. The modulator 608 modulates the module data onto the outgoing data, and processing by the driver 616 (1012 in FIG. 10) creates a signal capable of driving the optic signal generator 620 (1016 in FIG. 10). In this manner, the module data may be read from the module and output to a remote location via the optic fiber. Data may also be written to the optic module via the primary channel, such as a fiber optic, instead of the two wire interface.

Figure 11:
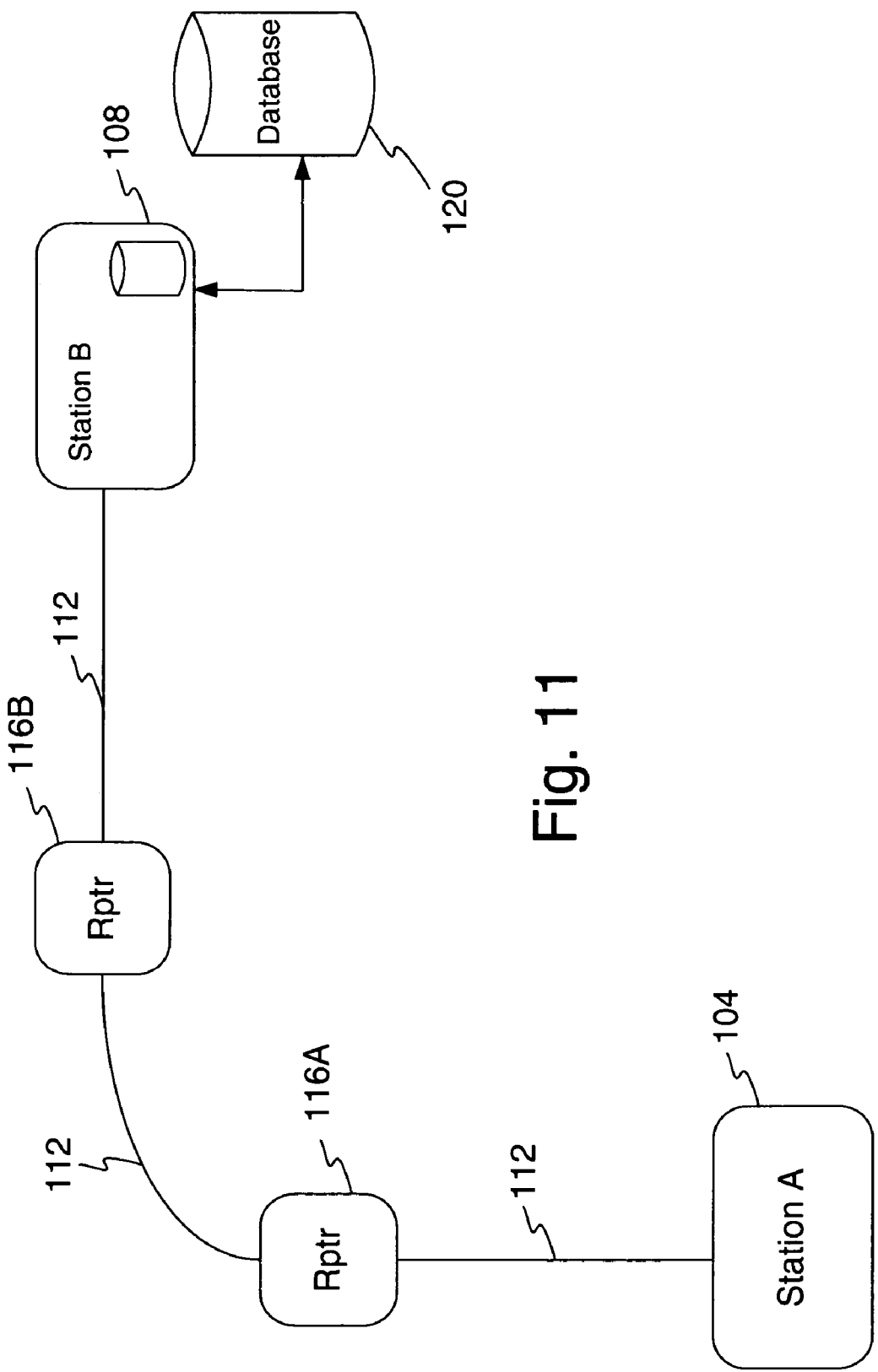
FIG. 11 illustrates an example embodiment, which is similar to FIG. 1, but which sets forth in more detail the functionality and components of FIG. 1.

FIG. 11 illustrates an example embodiment, which is similar to FIG. 1, but which sets forth in more detail the functionality and components of FIG. 1. Numerous aspects of FIG. 1 have been described above in greater detail and hence are not described again in detail. In this example embodiment it is contemplated that Station B 108 may comprise a control center capable of controlling and/or monitoring one or more modules, such may be located at Station A 104 or other elements 116A, 116B.

From Station B 108, which is designated for purposes of discussion as a control center, module data from the other module locations 104, 116A, 116B may be read and processed. The module data may be transmitted over the existing channel 112, which may comprise an optic fiber. Hence, the existing communication path may be utilized and in one embodiment the system transmits module data concurrent with system data, such as via a low frequency side channel. This provides the benefit of reading and monitoring one or more remotely located modules from a single location, such as a control center 108 without the need for additional communication channels, beyond channel 112. In addition, since the monitoring and receipt of module data occurs as a reduced number of locations, time consuming and costly physical travel to and physical connection to the remote locations 104, 116A, 116B may be avoided. Module data may be read from module memory or any other element of the module.

It is further contemplated that module data may be written to a remote module 104, 116A, 116B from a control module, such as Station B 108. Any station, element, or access point may serve as a control module or control center. In this manner, a single station, such as a control station 108 may write data to remote locations without dispatch of technicians or use of additional communication paths, such as a two wire conductors, to access the two wire interface. As stated above, this reduces complexity, cost, and eliminates the need for a technician to physically travel to each remote location.

Controlling and/or monitoring, such as via a read/write operation, from a remote location also provides real time access to module data and the ability to change the module data in real time. In emergency or time sensitive situations, this is a significant advantage over prior art system, which rely on a technician physically traveling to the module to read data, interpret alarms, or make changes to the module settings.

Other benefits may exist from utilizing a centralized control center, such as Station B 108. One such example is that control decision efficiency and cost reductions may be achieved. In addition, it is also contemplated that because module data may be accessed from a central location, Station B 108, from the other modules 104, 116A, 116B, a back-up may be made at a data base 120, which may be located remote from Station B 108 or at Station B 108, as shown. As a result module data from the other remote modules and the module at station 108 may be backed up for retrieval in case of failure. Rapidly, the back-up data may be re-loaded to a remote module. All such module data exchange may occur via the primary channel, such as the optic fiber, without use of the two wire interface or costly secondary path. Although all backup module data will aid recovery of a crashed module, certain data may be particularly desirable to backup and have available for immediate re-load.

It is further contemplated the multiple remote optic modules may be monitored, controlled, or communicated with from a single location, such as single control center. Thus, in reference to FIG. 11, data from Station A 104 may pass through element 116A and element 116B during an exchange between control center 108 and Station A 104.

While various embodiments of the invention have been described, it will be apparent to those of ordinary skill in the art that many more embodiments and implementations are possible that are within the scope of this invention.

What is claimed is:

1. A method for amplitude modulating module data with network data to allow exchange, via a fiber optic path, of optic module data with a remote location and an optic module control center, the method comprising:
   receiving network data;
   receiving module data for transmission with the network data;
   converting the network data to a drive signal configured to drive an optical signal generator, wherein the module data is amplitude modulated onto the network data;
   converting the network data drive signal to an optical signal, wherein one or more intensity levels of the optical signal are controlled by the module data;
   transmitting, via a fiber optic path, the network data and the module data to the optic module control center configured to process or re-transmit the network data and process the module data to evaluate one or more aspects of operation or environment of the optic module at the remote location.

2. The method of claim 1, wherein the module data comprises data regarding one or more of a module temperature value, a module current value, a time of operation value, and any value related to for diagnostic monitoring for an optical transceiver.

3. The method of claim 1, wherein one or more intensity levels comprise an upper intensity boundary, a lower intensity boundary or both.

4. The method of claim 1, wherein the control center comprises an optic module configured to communicate over an optic fiber with one or more remotely located optic modules.

5. The method of claim 1, further comprising memory at the control center configured to back up module data from one or more optic modules located at remote locations, wherein the module data is received over an optic fiber.

6. The method of claim 1, wherein the control center is further configured to transmit module data to the remotely located optic module and the remotely located optic module is further configured to receive module data from the control center via an optic fiber.

7. A method for communicating module data, via a fiber optic cable, between optic modules of an optical communication system to thereby control or monitor one or more aspects of operation of a optic module, the method comprising:
   obtaining module data from an optic module, wherein the module data is configured to provide information regarding one or more aspects of the optic module;
   generating an optical signal generator drive signal based on module data;
   providing the optical signal generator drive signal to an optical signal generator configured to generate an optical signal in response to the drive signal;
   generating an optical signal to represent the module data;
   while transmitting network data to a second optic module also transmitting the optical signal from a first optic module over a fiber optic channel to the second optic module;
   receiving the optical signal at a second optic module;
   converting the optical signal to a received electrical signal;
   processing the received signal to obtain the module data for use by the second optic module.

8. The method of claim 7, wherein the module data is amplitude modulated onto network data.

9. The method of claim 7, wherein the second optic module is configured as a control center with memory to store module data.

10. The method of claim 7, further comprising storing the module data at the second location to thereby control one or more aspects of the optic module at the second location based on the module data.

11. The method of claim 7, further comprising transmitting the module data through the optic module at the second location to an optic module at a third location.

12. The method of claim 7, wherein the module data comprise DDMI data.

13. The method of claim 7, wherein the module data from a first optic module is transmitted through one or more different optic modules before being received, and stored in a memory at the second location to create a backup.

14. A system for sending module data to a remote optic module from a central location via an optic fiber, the module data configured to control operation of one or more aspects of the remote optic module, the system comprising:
   a central location configured with access to an optic communication channel and transmitter configured to transmit module data on the optic communication channel to thereby control or monitor one or more aspects of the remote optic module;
   a remote optic module configured to:
      transmit and receive network data between other optic modules as part of a communication network;
      receive the module data from the central location, wherein the module data passes through an optic fiber;
      process or store the module data to thereby control one or more aspects of operation of the optic module based on the module data.

15. The system of claim 14, wherein the remote optic module further comprises memory configured to store one or more items of the module data.

16. The system of claim 14, wherein the remote optic module is further configured to transmit module data from the remote optic module to the central location via the optic communication channel.

17. The system of claim 14, wherein the central location further comprises memory configured to backup module data received from remote optic module.

18. The system of claim 14, wherein the module data comprises one or more addresses which identify a particular remote optic module from a group of two or more remote optic modules thereby allowing the central location to selectively communicate with a particular optic module via the optic communication channel.

19. The system of claim 14, wherein the optic module is configured to concurrently communicate network data while communicating module data with the central location.

20. The system of claim 14, wherein the module data consists of one or more of the following types of data: temperature data, supply voltage data, bias current data, modulation current data, optic output power data, optic input power data, alarm or warning threshold values.

* * * * *